United States Patent
Kawai

(10) Patent No.: US 12,041,215 B2
(45) Date of Patent: Jul. 16, 2024

(54) PROCESSING APPARATUS, METHOD, AND STORAGE MEDIUM FOR STORING PROGRAM

(71) Applicant: CANON KABUSHIKI KAISHA, Tokyo (JP)

(72) Inventor: Yoshinori Kawai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/296,722

(22) Filed: Apr. 6, 2023

(65) Prior Publication Data

US 2023/0353696 A1 Nov. 2, 2023

(30) Foreign Application Priority Data

Apr. 28, 2022 (JP) .................. 2022-075361

(51) Int. Cl.
*H04N 1/60* (2006.01)
(52) U.S. Cl.
CPC ......... *H04N 1/6008* (2013.01); *H04N 1/6025* (2013.01)
(58) Field of Classification Search
CPC ............ H04N 1/6008; H04N 1/6025

USPC ................................ 358/3.26, 1.9, 1.15
See application file for complete search history.

(56) References Cited

U.S. PATENT DOCUMENTS

| | | | |
|---|---|---|---|
| 2006/0028665 A1 | 2/2006 | Kawa | H04N 1/60 |
| 2008/0018962 A1 | 1/2008 | Kawai | G03F 3/08 |
| 2009/0003696 A1 | 1/2009 | Ishii et al. | G06K 9/00 |
| 2010/0207972 A1 | 8/2010 | Kawai | B41J 29/393 |
| 2013/0293615 A1 | 11/2013 | Kawai | B41J 2/21 |
| 2020/0172749 A1* | 6/2020 | Yamaguchi | B41M 5/5218 |
| 2020/0314292 A1* | 10/2020 | Yamashita | G01J 3/50 |

FOREIGN PATENT DOCUMENTS

| | | |
|---|---|---|
| JP | 2016-103695 | 6/2016 |
| JP | 2020-096351 | 6/2020 |

* cited by examiner

*Primary Examiner* — Quang N Vo
(74) *Attorney, Agent, or Firm* — Venable LLP

(57) ABSTRACT

The first conversion information is information for converting a color value of a first coordinate in a color space corresponding to the image data into ink data corresponding to ink of subtractive color mixture, and converting a color value of a second coordinate in the color space into ink data corresponding to ink of spot color which is different from a color of the ink of the subtractive color mixture. At least one of a plurality of coordinates adjacent to the second coordinate is the second coordinate.

18 Claims, 17 Drawing Sheets

| SPOT COLOR LIST | SPOT COLOR DEFINITION (R, G, B) | OUTPUT INK SEPARATION (C, M, Y, K, P) |
|---|---|---|
| SPOT COLOR 1 | (255,0,255) | (0,0,0,0,100%) |
| SPOT COLOR 2 | (255,64,255) | (0,0,0,0,75%) |
| SPOT COLOR 3 | (255,128,255) | (0,0,0,0,50%) |

| | SPOT COLOR DEFINITION (R, G, B) | OUTPUT INK SEPARATION (C, M, Y, K, FP) |
|---|---|---|
| NORMAL COLOR COLOR PALETTE 1 | (0,255,0) | (100,0,100,0,0%) |
| NORMAL COLOR COLOR PALETTE 2 | (0,0,192) | (80,80,0,20,0%) |
| ⋮ | ⋮ | ⋮ |

FIG. 13

| COLOR INPUT(R,G,B) | OUTPUT(C,M,Y,K,FP,FY) |
|---|---|
| (0,0,0) | (0,0,0,100,0,0) |
| (0,0,64) | (10,10,0,50,0,0) |
| (0,0,128) | (30,30,0,30,0,0) |
| ⋮ | ⋮ |
| (255,0,255) | (0,0,0,0,100,0) |
| (255,51,0) | (0,0,0,0,100,25) |
| ⋮ | ⋮ |
| (255,0,0) | (0,0,0,0,100,100) |
| ⋮ | ⋮ |
| (255,255,0) | (0,0,0,0,0,100) |
| ⋮ | ⋮ |
| (255,255,192) | (0,0,0,0,0,25) |
| (255,255,255) | (0,0,0,0,0) |

FIG. 14

| COLOR INPUT(R,G,B) | OUTPUT(C,M,Y,K,FP,FY) |
|---|---|
| (0,0,0) | (0,0,0,100,0,0) |
| (0,0,64) | (10,10,0,50,0,0) |
| (0,0,128) | (30,30,0,30,0,0) |
| ⋮ | ⋮ |
| (255,255,192) | (0,0,25,0,0,0) |
| (255,255,255) | (0,0,0,0,0) |

FIG. 15

|  | SPOT COLOR DEFINITION (R, G, B) | OUTPUT INK SEPARATION (C, M, Y, K, FP, FY) |
|---|---|---|
| SPOT COLOR 1 | 255,0,0 | 0,0,0,0,100%,100% |
| SPOT COLOR 2 | 255,0,64 | 0,0,0,0,100%,75% |
| SPOT COLOR 3 | 255,0,128 | 0,0,0,0,100%,50% |
| SPOT COLOR 4 | 255,0,192 | 0,0,0,0,100%,25% |
| SPOT COLOR 5 | 255,0,255 | 0,0,0,0,100%,0% |
| SPOT COLOR 6 | 255,64,0 | 0,0,0,0,75%,100% |
| SPOT COLOR 7 | 255,64,64 | 0,0,0,0,75%,75% |
| SPOT COLOR 8 | 255,64,128 | 0,0,0,0,75%,50% |
| SPOT COLOR 9 | 255,64,192 | 0,0,0,0,75%,25% |
| SPOT COLOR 10 | 255,64,255 | 0,0,0,0,75%,0% |
| SPOT COLOR 11 | 255,128,0 | 0,0,0,0,50%,100% |
| SPOT COLOR 12 | 255,128,64 | 0,0,0,0,50%,75% |
| SPOT COLOR 13 | 255,128,128 | 0,0,0,0,50%,50% |
| SPOT COLOR 14 | 255,128,192 | 0,0,0,0,50%,25% |
| SPOT COLOR 15 | 255,128,255 | 0,0,0,0,50%,0% |
| SPOT COLOR 16 | 255,192,0 | 0,0,0,0,25%,100% |
| SPOT COLOR 17 | 255,192,64 | 0,0,0,0,25%,75% |
| SPOT COLOR 18 | 255,192,128 | 0,0,0,0,25%,50% |
| SPOT COLOR 19 | 255,192,192 | 0,0,0,0,25%,25% |
| SPOT COLOR 20 | 255,192,255 | 0,0,0,0,25%,0% |
| SPOT COLOR 21 | 255,255,0 | 0,0,0,0,0%,100% |
| SPOT COLOR 22 | 255,255,64 | 0,0,0,0,0%,75% |
| SPOT COLOR 23 | 255,255,128 | 0,0,0,0,0%,50% |
| SPOT COLOR 24 | 255,255,192 | 0,0,0,0,0%,25% |

|  | GRID POINT (R, G, B) | OUTPUT INK SEPARATION (C, M, Y, K, FP, FY) |
|---|---|---|
| NORMAL COLOR | 255,0,0 | 0,100%,100%,0,0,0 |
| NORMAL COLOR | 255,0,64 | 0,100%,75%,0,0,0 |
| NORMAL COLOR | 255,64,0 | 0,75%,100%,0,0,0 |
| SPOT COLOR 7 | 255,64,64 | 0,0,0,0,75%,75% |

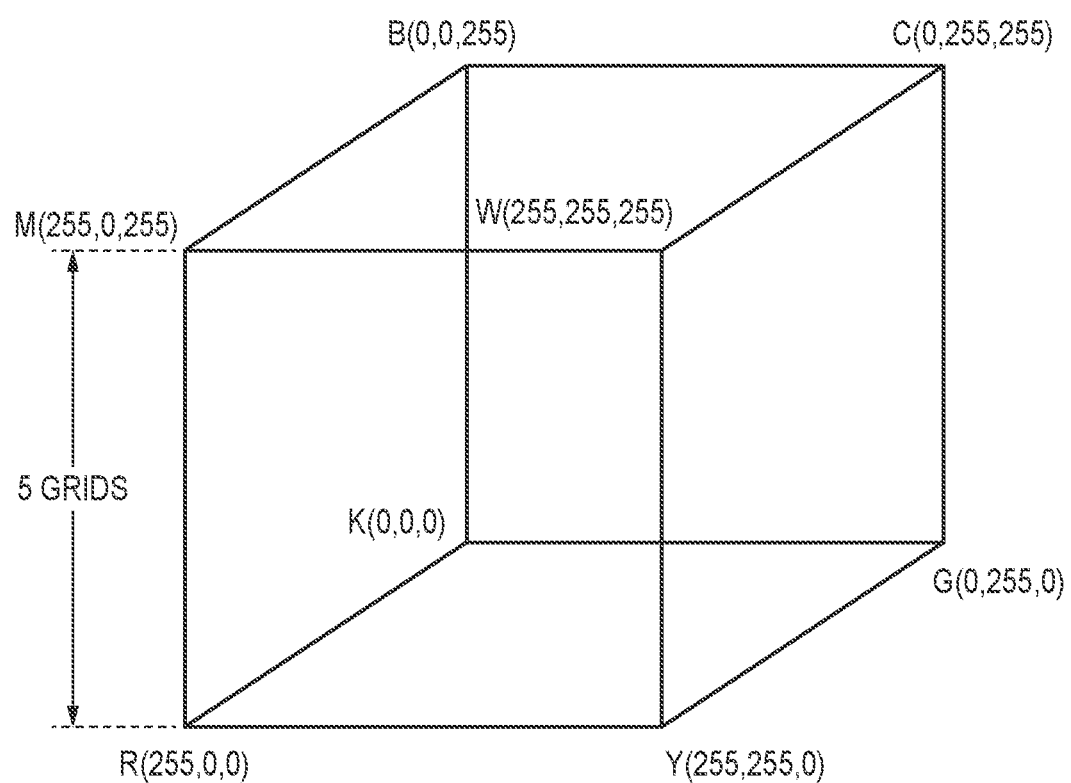
F I G. 18

PROCESSING APPARATUS, METHOD, AND STORAGE MEDIUM FOR STORING PROGRAM

BACKGROUND OF THE INVENTION

Field of the Invention

The present invention relates to a technique for forming an image on a print medium.

Description of the Related Art

There are known printing apparatuses that use ink containing color materials that exhibit fluorescence (referred to as "fluorescent ink" below), or ink containing metal particles (referred to as "metallic ink" below). In the following, fluorescent ink and metallic ink are referred to as special ink. For printing with special ink, plate data defining a use amount of the special ink needs to be separately appended to print data in addition to the usual data, or a special command instructing to use the special ink needs to be transmitted to the printing apparatus. In addition, since general applications do not support special ink in many cases, it is necessary to adapt special ink to various applications.

Japanese Patent Laid-Open No. 2016-103695 describes that a printer driver is caused to specify a replacement color from a normal-color, and specify a special ink for replacement for the replacement color. It is presumed that correspondence between replacement colors and special ink is a one-to-one correspondence, and it is presumed that data compression is performed by reversible compression.

In order to effectively generate noticeable posters or printed materials, many applications have a color palette function. The user can generate noticeable posters or printed materials by using special ink on a part desired to make noticeable as characters or background color. Japanese Patent Laid-Open No. 2020-96351 describes a method of using metallic ink, which is one of special ink, for the color palette function.

SUMMARY OF THE INVENTION

The present invention provides a processing apparatus, a method, and a storage medium storing a program for preventing, in a case where a spot color is used for printing image data, reduction of printing effect due to the spot color even when a color value shift occurs in the image data.

The present invention in one aspect provides a processing apparatus a processing apparatus comprising: an input unit configured to input image data; and a generation unit configured to generate ink data for forming an image on a print medium, by using first conversion information in which an ink color is associated with each coordinate in a color space corresponding to the image data, wherein the first conversion information is information for converting a color value of a first coordinate in a color space corresponding to the image data into ink data corresponding to ink of subtractive color mixture, and converting a color value of a second coordinate in the color space into ink data corresponding to ink of spot color which is different from a color of the ink of the subtractive color mixture, and at least one of a plurality of coordinates adjacent to the second coordinate is the second coordinate.

The present invention allows for preventing, in a case where a spot color is used for printing image data, reduction of printing effect due to the spot color even when a color value shift occurs in the image data.

Further features of the present invention will become apparent from the following description of exemplary embodiments with reference to the attached drawings.

BRIEF DESCRIPTION OF THE DRAWINGS

FIG. 13 is a diagram illustrating an LUT to be used for ink separation from RGB;

FIG. 14 is a diagram illustrating an LUT to be used for ink separation from RGB for normal colors;

FIG. 15 is a diagram illustrating correspondence relation between RGB and ink separation values of fluorescent ink;

FIG. 18 is an explanatory diagram of a region including grid points used as a fluorescent spot colors;

DESCRIPTION OF THE EMBODIMENTS

Figure 1:
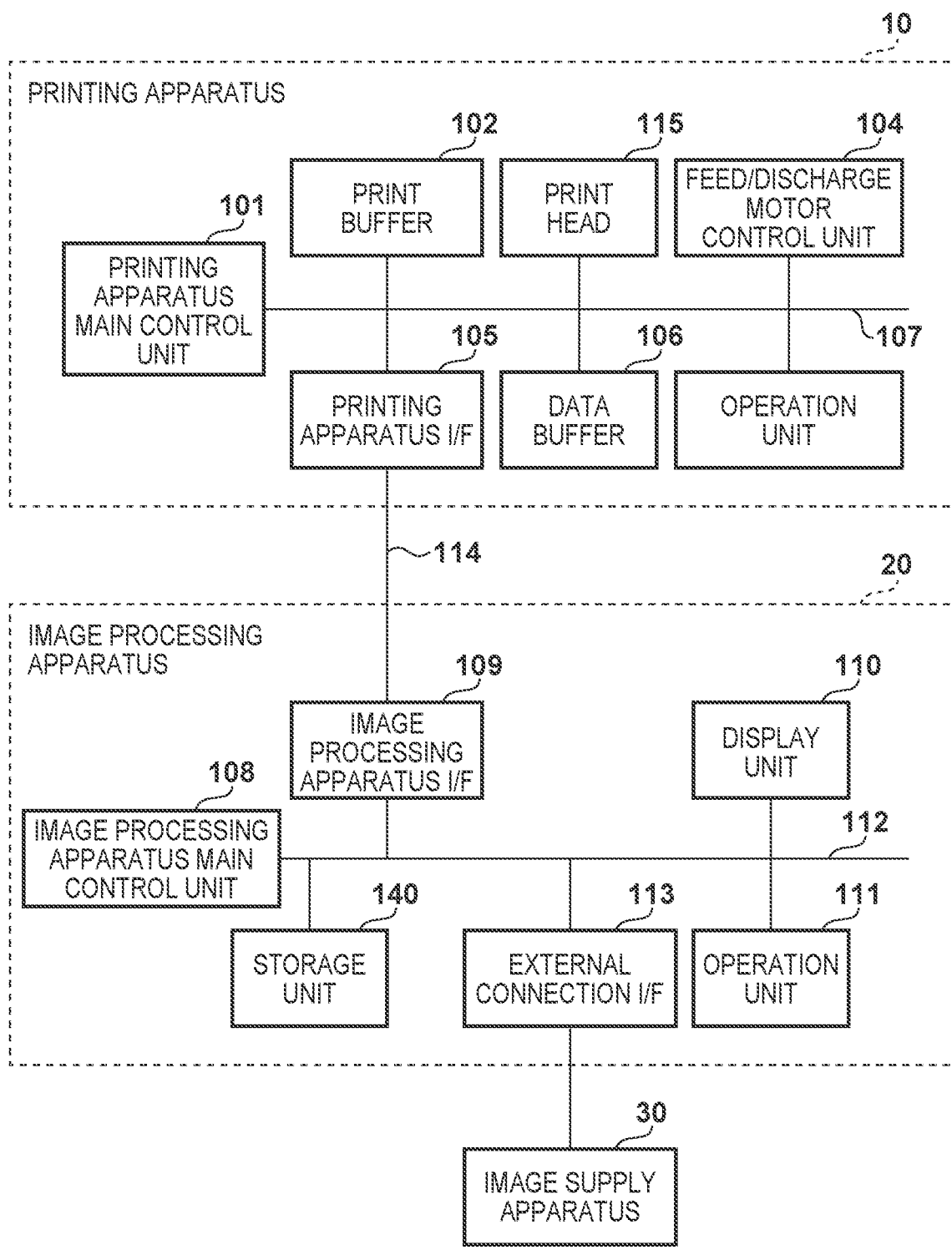
FIG. 1 is a block diagram illustrating an example of a configuration of an inkjet printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The image data to be printed may be subjected to lossy compression such as JPEG for size reduction. Decompressing the lossy compressed image data may cause a color value shift in the color space of the image data. In a case where image data is generated such that a spot color is used for printing the image data, a color value shift may reduce the printing effect by the spot color.

According to the present disclosure, in a case where a spot color is used for printing image data, reduction of printing effect due to the spot color can be prevented even when a shift has occurred in the color value of the image data.

First Embodiment

FIG. 1 is a block diagram illustrating an example of a configuration of an inkjet printing system as an example of an image processing system according to the present embodiment. The inkjet printing system according to the present embodiment is configured by including an image supply apparatus 30, an image processing apparatus 20, and an inkjet printing apparatus 10 (also simply referred to as a printing apparatus 10 below).

Image data supplied from the image supply apparatus 30 such as a PC is subjected to predetermined image processing in the image processing apparatus 20, and subsequently sent to the printing apparatus 10 as print data, and then an image is printed by ejecting ink on a print medium. The image processing apparatus 20 is an information processing apparatus such as a host PC, a tablet PC, or a smartphone, which allows a user to generate a poster image. The predetermined image processing is executed by, for example, an application for generating a poster image installed in the image processing apparatus 20.

In the image processing apparatus 20, a main control unit 108, which is configured by including a CPU and memories such as a ROM and a RAM, comprehensively controls the entire image processing apparatus 20. The memory included in the main control unit 108 stores various programs and an operating system (OS). The operation of the image processing apparatus 20 according to the present embodiment is realized by the CPU, for example, reading a program stored in the ROM to the RAM and executing the same. The programs include an application program for executing image processing on the image data supplied from the image supply apparatus 30 and generating print data for printing by the printing apparatus 10.

The image processing apparatus 20 further includes an image processing apparatus interface (I/F) 109, an external connection interface (I/F) 113, a display unit 110, an operation unit 111, and a storage unit 140. The external connection I/F 113 is an interface for enabling transmission and reception of data to and from the image supply apparatus 30, and configured depending on a network medium. The image processing apparatus I/F 109 is an interface for enabling transmission and reception of data to and from the printing apparatus 10. Here, the image processing apparatus 20 is connected to the printing apparatus 10 via a communication line 114. In the present embodiment, the communication line 114 will be described as Ethernet, as an example. However, the communication line 114 may also be a USB hub, a wireless communication network using wireless access points, or connection using a Wi-Fi direct communication function. The operation unit 111 is configured by a keyboard or the like, and can receive operations from the user. The display unit 110 is configured by a display, a panel, or the like, and can display various user interface screens. The storage unit 140 stores an application program 150 for executing a process described below and data used for the process.

In the printing apparatus 10, a main control unit 101, which is configured by including a CPU and memories such as a ROM and a RAM, comprehensively controls the entire printing apparatus 10. The memory included in the main control unit 101 stores various programs. The operation of the printing apparatus 10 according to the present embodiment is realized by the CPU, for example, reading a program stored in the ROM to the RAM and executing the same.

The printing apparatus I/F 105 is an interface for enabling transmission and reception of data to and from the image processing apparatus 20. A data buffer 106 is a buffer memory configured to hold print data which is sent from the image processing apparatus 20. The print buffer 102 is a buffer memory that holds the print data, which is held in the data buffer 106, as raster data before the print data is transferred to a print head 115. When the data is stored in the print buffer 102, the main control unit 101 performs processing such as data conversion into a color space which allows printing by the print head 115, or memory conversion converting into a data array which allows ejection from the nozzles of the print head 115.

The print head 115, which is a print head of ink jet printing system including a plurality of print nozzles that can eject ink droplets, ejects ink droplets from each print nozzle in accordance with the print data held in the print buffer 102. It is assumed in the present embodiment that the print head 115 is a so-called serial type print head that can reciprocally move in a direction orthogonal to the conveyance direction of the print medium, and print an image by reciprocal move (scanning) and conveyance operations. It is assumed that the print head 115 includes print nozzle columns of a total of five colors, i.e., four colors of process color ink cyan (C), magenta (M), yellow (Y) and black (K), and fluorescent ink (F). Here, the print head 115 may also be a so-called line type print head extending across the entire print width of the print medium, instead of a serial print head.

It is assumed in the present embodiment that the print data transmitted from the image processing apparatus 20 to the printing apparatus 10 is RGB data defined on an RGB color space. The main control unit 101 converts the transmitted RGB data into subtractive color mixture ink data (corresponding to the four colors, CMYK, for example) of the printing apparatus 10, or ink data including fluorescent ink (corresponding to the five colors, CMYKF, for example). The converted data is transferred to the print head 115. As has been described above, the printing apparatus 10 in the present embodiment also serves as a data processing apparatus that performs data processing using the functions of the main control unit. The main control unit 101 then drives a carriage motor (not illustrated) that operates the print head 115, and further drives a conveyance motor that operates conveyance rollers configured to convey the print medium. As a result, the print head 115 scans the print medium in a direction orthogonal to the conveyance direction, and simultaneously the print head 115 ejects ink droplets of a predetermined color on the print medium to form an image.

When printing is performed by a plurality of scans, the main control unit 101 performs a process of determining a scanning order (scanning order determination process). In order to generate data corresponding to each scan, the scanning order determination process uses a mask pattern or the like to perform an image thinning process on data subjected to a quantization process. Although five colors CMYKF are taken as an example of ink colors in the present embodiment, other ink colors having a low density such as light cyan (Lc), light magenta (Lm), gray (Gy), or the like may also be used for improving the image quality. When using such ink colors, ink data corresponding to each ink color is generated. Here, the present embodiment will be described assuming that the ink of light cyan (Lc), light magenta (Lm) and gray (Gy) are also included in the subtractive color mixture ink. Furthermore, description will be provided assuming that achromatic color ink such as black (K) and gray (Gy) are also included in the subtractive color mixture ink.

In the following, description will be provided taking as an example a case in which the print head 115 includes five print nozzle columns of color ink of four colors of cyan (C), magenta (M), yellow (Y) and black (K), and fluorescent pink (FP) ink. Here, fluorescent red (FR), fluorescent yellow (FP), fluorescent green (FG) or fluorescent blue (FB) may be used as the fluorescent ink besides fluorescent pink, in which case a plurality of fluorescent ink may be used. It is preferable to use the ink having a color development hue angle being close to that of a chromatic subtractive color mixture ink as the fluorescent ink. For example, a combination is preferable such as magenta ink and fluorescent pink having a hue angle being close to magenta ink, yellow ink and fluorescent yellow having a hue angle being close to yellow ink, or cyan ink and fluorescent blue having a hue angle being close to cyan ink.

Figure 20:
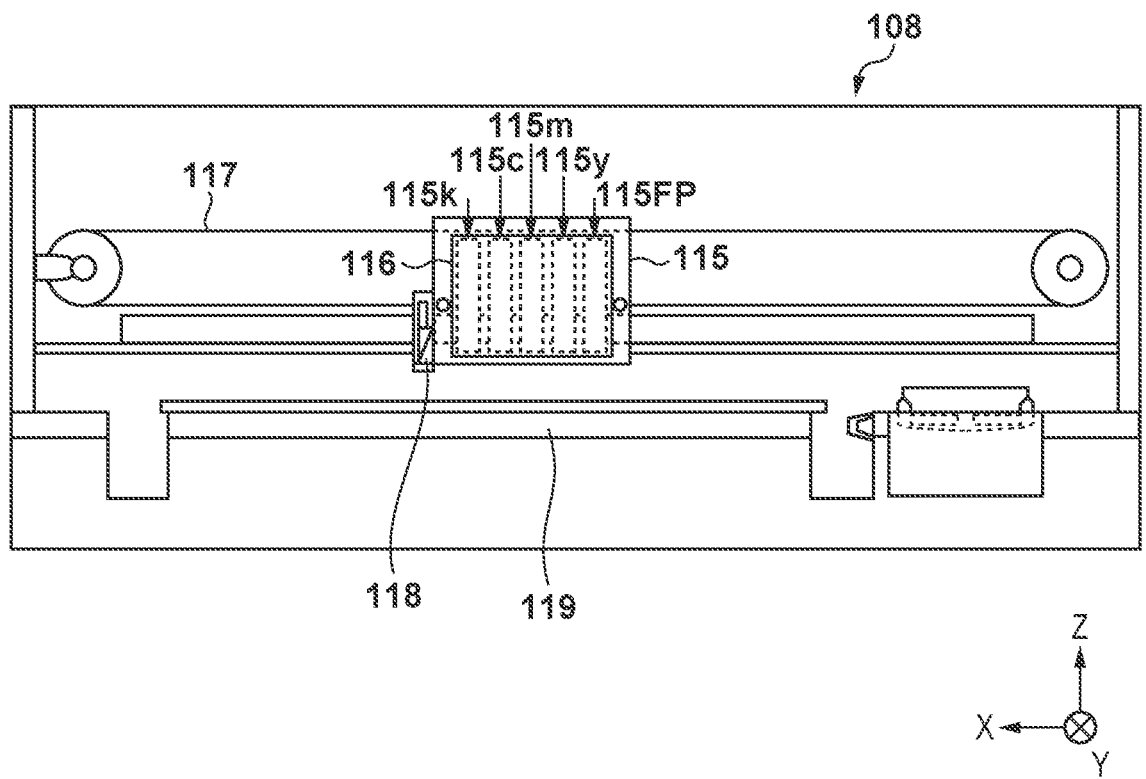
FIG. 20 is an explanatory diagram of a print head.

FIG. 20 is an explanatory diagram of the print head 115. The print head 115 includes a carriage 116, nozzle columns 115k, 115c, 115m, 115y and 115FP, and an optical sensor 118. The carriage 116, having the five nozzle columns 115k, 115c, 115m, 115y and 115FP, and the optical sensor 118 installed thereon, can reciprocally move in the X direction (main scanning direction) in the drawing by a driving force of the carriage motor transmitted via a belt 117. While the carriage 116 is moving in the X direction relative to the print medium, ink droplets are ejected from respective nozzles of the nozzle column in the gravity direction (the Z direction in the drawing) based on the print data. Accordingly, an image of a single main scan is printed on a print medium arranged on a platen 119. Upon completion of a single main scan, the print medium is conveyed along the conveyance direction (Y direction in the drawing) by a distance corresponding to the width of a single main scan. By repeating the main scanning and the conveying operation alternately, an image is gradually formed on the print medium. In a case of scanning times being eight times, for example, a region for the first scan, a region for the second scan, and so on, continue from the upstream in the sheet feeding direction (Y direction) finally to a region of the eighth scan. While moving together with the carriage 116, the optical sensor 118 outputs a signal according to whether or not a print medium exists on the platen 119, and the main control unit 101 determines whether or not a print medium exists on the platen 119, based on the detection signal from the optical sensor 118.

Figure 21:
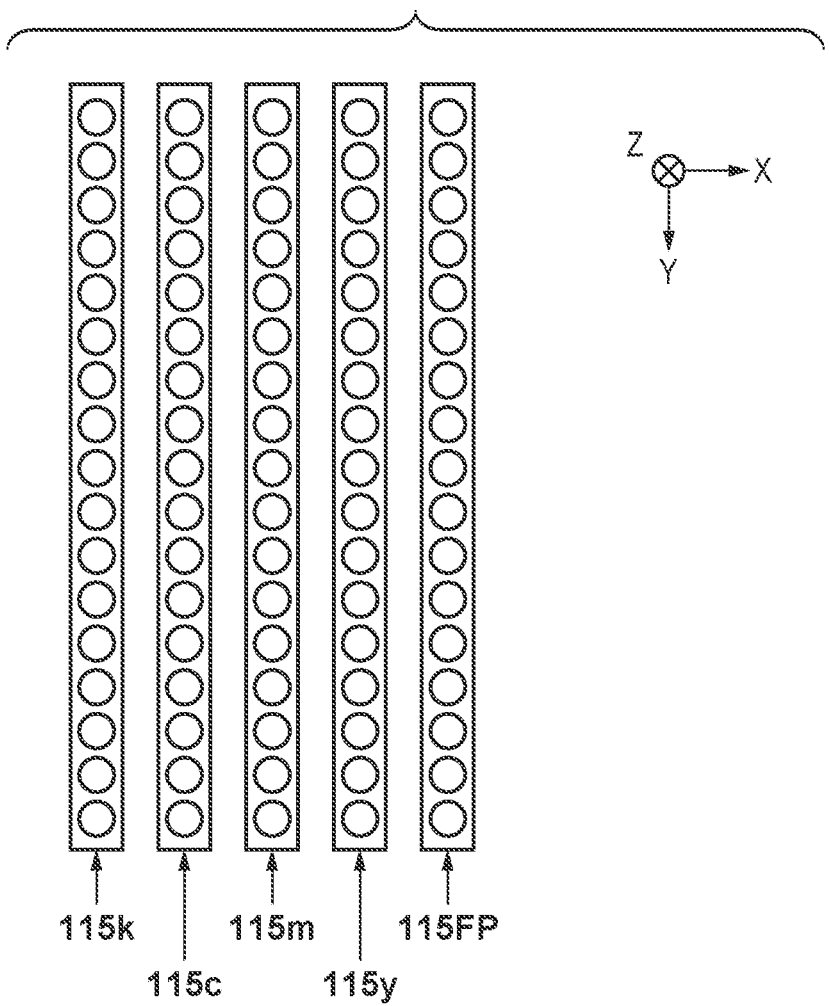
FIG. 21 is a diagram illustrating an arrangement of nozzle columns of a print head.

FIG. 21 is a diagram illustrating an arrangement of nozzle columns of the print head 115 viewing from the top surface of the apparatus (−Z direction). The print head 115 includes five nozzle columns arranged at different positions in the X direction. In FIG. 20, five columns are arranged, namely, a nozzle column 115C corresponding to C-ink, a nozzle column 115M corresponding to M-ink, a nozzle column 115Y corresponding to Y-ink, a nozzle column 115K corresponding to K-ink, and a nozzle column 115FP corresponding to FP-ink. C-ink is ejected from nozzles in the nozzle column 115C. M-ink is ejected from nozzles in the nozzle column 115M. Y-ink is ejected from nozzles in the nozzle column 115Y. K-ink is ejected from the nozzles in the nozzle column 115K. FP-ink is ejected from the nozzle column 115FP. In each nozzle column, a plurality of nozzles configured to eject ink as droplets are arranged at a predetermined pitch in the Y direction.

About the Characteristics of Fluorescent Ink and Subtractive Color Mixture Ink

Figure 2:
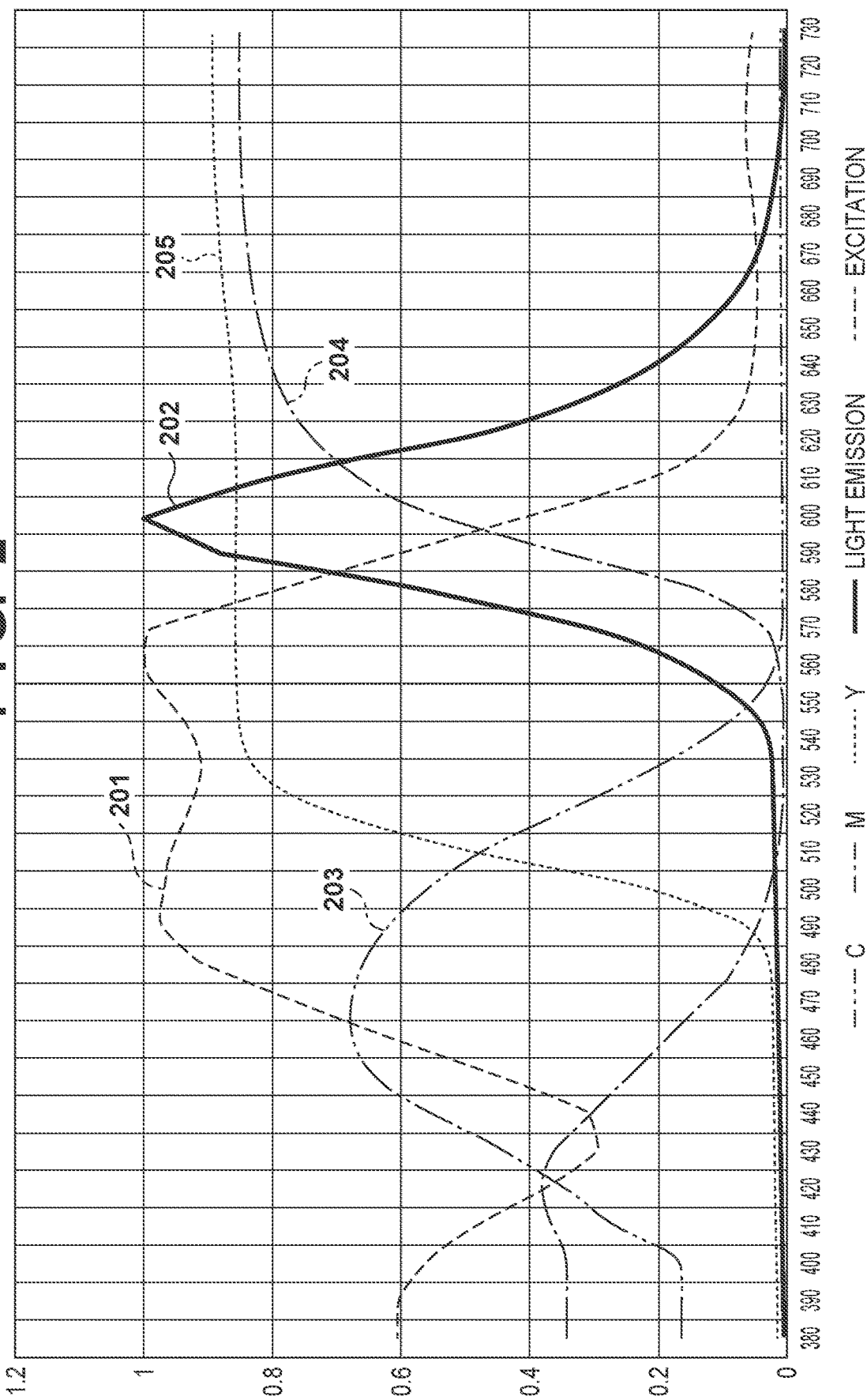
FIG. 2 is a diagram illustrating intensity of an excitation wavelength and intensity of an emission wavelength.

The fluorescent color material is color material that develops color by entering an excited state from a ground state by absorbing light of an excitation wavelength, and returning to the ground state by emitting light of an emission wavelength. FIG. 2 is a graph illustrating intensity of an excitation wavelength 201 and intensity of an emission wavelength 202 when fluorescent pink ink is printed on a print medium. The horizontal axis in FIG. 2 represents the wavelength of light, and the vertical axis represents the intensity. The graph illustrated in FIG. 2 indicates each intensity of the wavelength of light irradiated on a print sample and the wavelength of light received from the sample, which are respectively varied and detected.

The emission wavelength 202 represents, for each wavelength, the intensity of light received from the print sample when the print sample is irradiated with light of an excitation wavelength. FIG. 2 illustrates a case where the print sample is irradiated with visible light of a wavelength of 480 nm. The excitation wavelength 201 represents the intensity of light received while the wavelength of the light irradiated on the print sample is varied, with the wavelength of received light being fixed. FIG. 2 illustrates a case where the wavelength of the received light is fixed at 600 nm. As illustrated in FIG. 2, the wavelength range, in which the fluorescent ink printed on the print medium is excited, overlaps with the wavelength range of emitted light and is at the short wavelength side. In addition, the excitation wavelength 201 has intensity varying depending on the wavelength, in other words, light is efficiently emitted at some wavelengths and inefficiently at others wavelengths. Additionally, the fluorescent color material emits light, and therefore its reflectance at the emission wavelength often exceeds 1. In the present embodiment, a color material having the aforementioned characteristics is referred to as a fluorescent color material.

Although the emission wavelength 202 is illustrated for a case of irradiating with visible light of 480 nm, it also has an excitation intensity at 380 nm as can be seen from the excitation wavelength 201. Therefore, fluorescent ink is usually excited also by an ultraviolet light (UV light) at 380 nm or less.

Although excitation and light emission of fluorescent pink ink have been described above, fluorescent ink that emits light at other wavelengths may also be used in the present embodiment. For example, fluorescent blue ink that emits light in a blue region (from 450 nm to 500 nm) may be used or fluorescent green ink that emits light in a green region (from 500 nm to 565 nm) may be used. Furthermore, fluorescent yellow ink that emits light in a yellow region (565 nm to 590 nm) may be used, or fluorescent orange ink or fluorescent red ink that emits light in a red region (590 nm to 780 nm) may be used. Moreover, fluorescent ink having combined the aforementioned types of ink may also be used. For example, fluorescent yellow ink that emits light in a region, where the yellow region and the red region are combined, may be used. Furthermore, the color tone may be adjusted by combining different types of fluorescent ink having different intensity of the excitation wavelength. For example, fluorescent pink that has weak excitation in the blue region and has strong excitation in the green region and then emits light in the orange region may also be used.

In the present embodiment, nonfluorescent ink is referred to as subtractive color mixture ink. In other words, ink which absorbs light of a specific wavelength among irradiated light without emitting light is referred to as subtractive color mixture ink. For example, subtractive color mixture ink has a spectral reflectance as indicated by cyan ink 203, magenta ink 204, and yellow ink 205 illustrated in FIG. 2. The graph illustrated in FIG. 2 indicates spectral characteristics based on the result of measurement using the method of measuring spectral reflectance. Unlike fluorescent ink, subtractive color mixture ink only absorbs light and therefore its reflectance does not exceed 1. Although the present embodiment is described including black ink as a type of subtractive color mixture ink, black ink may not be included.

Next, mixing of fluorescent ink and subtractive color mixture ink on the print medium will be described, referring to FIG. 2. In the drawing, at least a part of the excitation wavelength region of fluorescent pink ink is within the absorption wavelength region of yellow ink. When the fluorescent pink ink and the yellow ink 205 are mixed, the yellow ink absorbs light in the wavelength range of the excitation wavelength 201 of the fluorescent pink ink. Therefore, since exciting light for the fluorescent pink ink is absorbed by the yellow ink, the fluorescent pink ink cannot be sufficiently excited, whereby light emission is suppressed.

In addition, at least a part of the emission wavelength region of the fluorescent pink ink is within the absorption wavelength region of cyan ink. When the fluorescent pink ink and the cyan ink 203 are mixed, the cyan ink absorbs light in the wavelength range of the emission wavelength 202 of the fluorescent pink ink. Therefore, the light emitted from the fluorescent pink ink is absorbed by the cyan ink, whereby light emission is suppressed.

In addition, at least a part of the excitation wavelength region of the fluorescent pink ink is within the absorption wavelength region of magenta ink. When the fluorescent pink ink and the magenta ink 204 are mixed, the magenta ink absorbs light in a wavelength range in which the excitation sensitivity of the fluorescent pink ink is high. Therefore, the fluorescent pink ink cannot be sufficiently excited, whereby light emission is suppressed. Further, the light emitted from the fluorescent pink ink is absorbed by the magenta ink, whereby light emission is suppressed.

When the fluorescent pink ink and black ink (not illustrated) are mixed, the black ink absorbs light in the wavelength range of the excitation wavelength 201 of the fluorescent pink ink and also absorbs light in the wavelength range of the emission wavelength 202. Therefore, the fluorescent pink ink cannot be sufficiently excited, and light emission is also suppressed.

In other words, when the fluorescent pink ink and the subtractive color mixture ink are mixed, a contribution rate of the fluorescent pink ink to the color development is reduced. This property is largely affected also by the positional relation between the fluorescent ink and the subtractive color mixture ink on the print medium. In comparison with the case where an ink layer of the fluorescent ink is located at upper layer than an ink layer of the subtractive color mixture ink, when the ink layer of the fluorescent ink is located at lower layer than an ink layer of the subtractive color mixture ink, the fluorescent ink is more strongly affected by the subtractive color mixture ink. As a result, the contribution rate of the fluorescent pink ink to color development is smaller when the fluorescent ink is at lower layer than the subtractive color mixture ink compared to a case where the fluorescent ink is at upper layer than the subtractive color mixture ink.

About Fluorescent Ink

Next, fluorescent ink used in the present embodiment will be described. In the present embodiment, fluorescent ink prepared by mixing dispersion of a color material having fluorescence characteristics, solvent, and activator is used. The dispersion of fluorescent color material used in the present embodiment is dispersion of the color material having the aforementioned fluorescence characteristics. For example, although the dispersion is NKW-3207E (fluorescent pink aqueous dispersion: NIPPON KEIKO KAGAKU CO., LTD.) or NKW-3205E (fluorescent yellow aqueous dispersion: NIPPON KEIKO KAGAKU CO., LTD.), any dispersion of a color material may be used as long as the dispersion has fluorescence characteristics.

Ink is formed by combining the aforementioned fluorescent color material dispersion with known solvent and activator and dispersing the fluorescent color material dispersion. The manner of dispersing the fluorescent color material dispersion is not particularly limited. For example, fluorescent color material dispersion dispersed using surfactant, resin-dispersed fluorescent color material dispersion dispersed using dispersion resin, or the like may be used. Naturally, a combination of fluorescent color material dispersion dispersed in different manners may also be used. Anionic, nonionic, cationic or amphoteric activator can be used as the surfactant. Any type of resin can be used as the dispersion resin as long as it is water soluble or water dispersible, among those dispersion resin, the dispersion resin having a weight average molecular weight of 1,000 or more and 100,000 or less, more preferably 3,000 or more and 50,000 or less is particularly preferred. It is preferred to use, for example, an aqueous medium containing water and water-soluble organic solvent as the solvent.

Light Emission Efficiency and Color Gamut Enlargement Efficiency of Printing Using Fluorescent Ink Light emission efficiency and color gamut enlargement efficiency of printing using fluorescent ink will be described taking as an example the case of using fluorescent pink ink illustrated in FIG. 2.

Light emission efficiency and color gamut enlargement efficiency can be obtained not only with single-color fluorescent pink but also with a combination of fluorescent pink and other types of ink, by which light emission is suppressed and output of a high color development is obtained depending on the combination of ink. FIGS. 3A to 3C illustrate light emission efficiency and color gamut enlargement efficiency using fluorescent pink ink. It is assumed in FIGS. 3A to 3C that a color gamut is defined in a Lab space.

FIG. 3A is a cross-sectional view of a printer gamut with a 350-degree hue. The vertical axis represents brightness in the Lab space, and the horizontal axis represents saturation in the Lab space. The 350-degree hue is substantially identical to the hue of a case where printing is performed with single-color fluorescent pink ink. A color gamut 301 is a color gamut of a case where the fluorescent pink is used, and a color gamut 302 is a color gamut of a case where the fluorescent pink is not used. As indicated by the color gamut 301, using the fluorescent pink allows for enlarging a printable color gamut.

FIG. 3B is a cross-sectional view of a pink color gamut with a 55-degree hue. A color gamut 303 is a color gamut of a case where the fluorescent pink is used, and a color gamut 304 is a color gamut of a case where the fluorescent pink is not used. As indicated by the color gamut 303, using the fluorescent pink and yellow in combination allows for enlarging the color gamut.

FIG. 3C is a cross-sectional view of a violet color gamut with a 315-degree hue. A color gamut 305 is a color gamut of a case where the fluorescent pink is used, and a color gamut 306 is a color gamut of a case where the fluorescent pink is not used. As indicated by the color gamut 305, using the fluorescent pink and cyan in combination allows for enlarging the color gamut.

In particular, the combination with Y-ink, which has the least effect of suppressing light emission of the fluorescent pink among C-ink, M-ink, and Y-ink, does not suppress color development, whereby light emission efficiency and color gamut enlargement efficiency at the brightness side are obtained with orange color.

Although FIGS. 3A to 3C illustrate only the case of single-color of fluorescent pink as the fluorescent ink, using two fluorescent ink colors, i.e., fluorescent pink and fluorescent yellow, allows for obtaining further enlargement in the color gamut enlargement and obtaining light emission efficiency illustrated in FIG. 3B. In addition, although the color gamuts illustrated in FIGS. 3A to 3C are color gamuts of the cases where visible light is irradiated, irradiating light including ultraviolet light (UV light) as described above can increase light emission efficiency of the fluorescent ink.

About Poster Image Using Fluorescent Ink and Fluorescent Spot Color

A poster image using fluorescent ink will be described, referring to FIGS. 4 and 5. For example, the poster image illustrated in FIG. 4 includes a background part 401, figure parts 402 and 403, and a character part 404. Next, colors used for printing the poster image illustrated in FIG. 4 will be described, referring to FIG. 5. FIG. 5 corresponds to FIG. 3A. Colors 501, 502, 503 and 504 are colors included in a color gamut that can be printed without using fluorescent pink, whereas colors 505 and 506 are colors included in a color gamut that can be printed using the fluorescent pink.

It is assumed that the background part 401 is printed using the color 501 and the FIG. 402 is printed using the color 502. In normal printing that does not use the fluorescent pink, the FIG. 403 is printed using the color 503 and the character 404 is printed using the color 504. On the other hand, in printing that uses the fluorescent pink, the FIG. 403 is printed using the color 505, and the character 404 is printed using the color 506. The colors 505 and 506, which are colors that cannot be printed without using the fluorescent pink, can be printed as bright vivid colors due to the light emission efficiency of the fluorescent ink in comparison with the colors 501 and 502. Therefore, it is possible to generate a poster image that is eye-catching with the FIG. 403 and the character 404 as one point. In the present embodiment, an eye-catching color with one point using fluorescent ink such as the colors 505 and 506, is referred to as a fluorescent spot color. In the fluorescent spot color, a higher light emission efficiency of the fluorescent ink appears by irradiating ultraviolet light (UV light) in addition to normal visible light as the light emission efficiency of the fluorescent ink, which allows for generating more noticeable poster image.

A method of generating a poster image using fluorescent ink in an application that handles RGB data will be described.

In the present embodiment, since the application can process RGB values, RGB values to be specified as a color palette in the application are preliminarily determined, with respect to the ink separation of a fluorescent spot color for the printing apparatus 10. In the application, colors are defined as a color palette in order to easily read and use a specific color. In the present embodiment, the RGB values to be specified are also preliminarily determined for the fluorescent spot color, whereby it become possible to use a plurality of combinations including the fluorescent spot color as the color palette.

Figure 6:
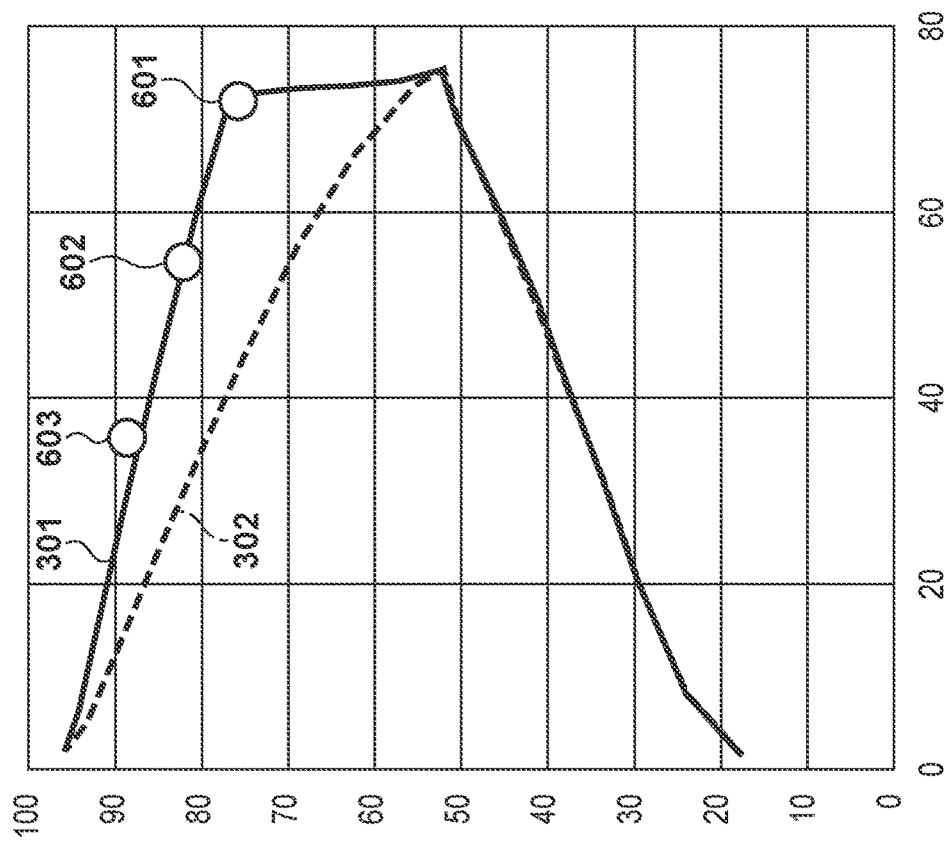
FIG. 6 is a diagram illustrating fluorescent spot colors within a color gamut.

For simplicity, the following three types of fluorescent spot colors are assumed as an example. A fluorescent spot color 1 is set as a color to be printed with an ink separation of (C, M, Y, K, FP)=(0, 0, 0, 0, 100%). Similarly, a fluorescent spot color 2 is set as a color to be printed with (C, M, Y, K, FP)=(0, 0, 0, 0, 75%), and a fluorescent spot color 3 is set as a color to be printed with (C, M, Y, K, FP)=(0, 0, 0, 0, 50%). A color 601 illustrated in FIG. 6 indicates an output of fluorescent spot color 1, a color 602 indicates an output of the fluorescent spot color 2, and a color 603 indicates an output of the fluorescent spot color 3. As illustrated in FIG. 6, the colors 601 to 603 are colors that cannot be reproduced without using the fluorescent pink, thus the user can generate an eye-catching poster image with one point using colors 601 to 603 (fluorescent spot colors 1 to 3).

Figures 7, 8:
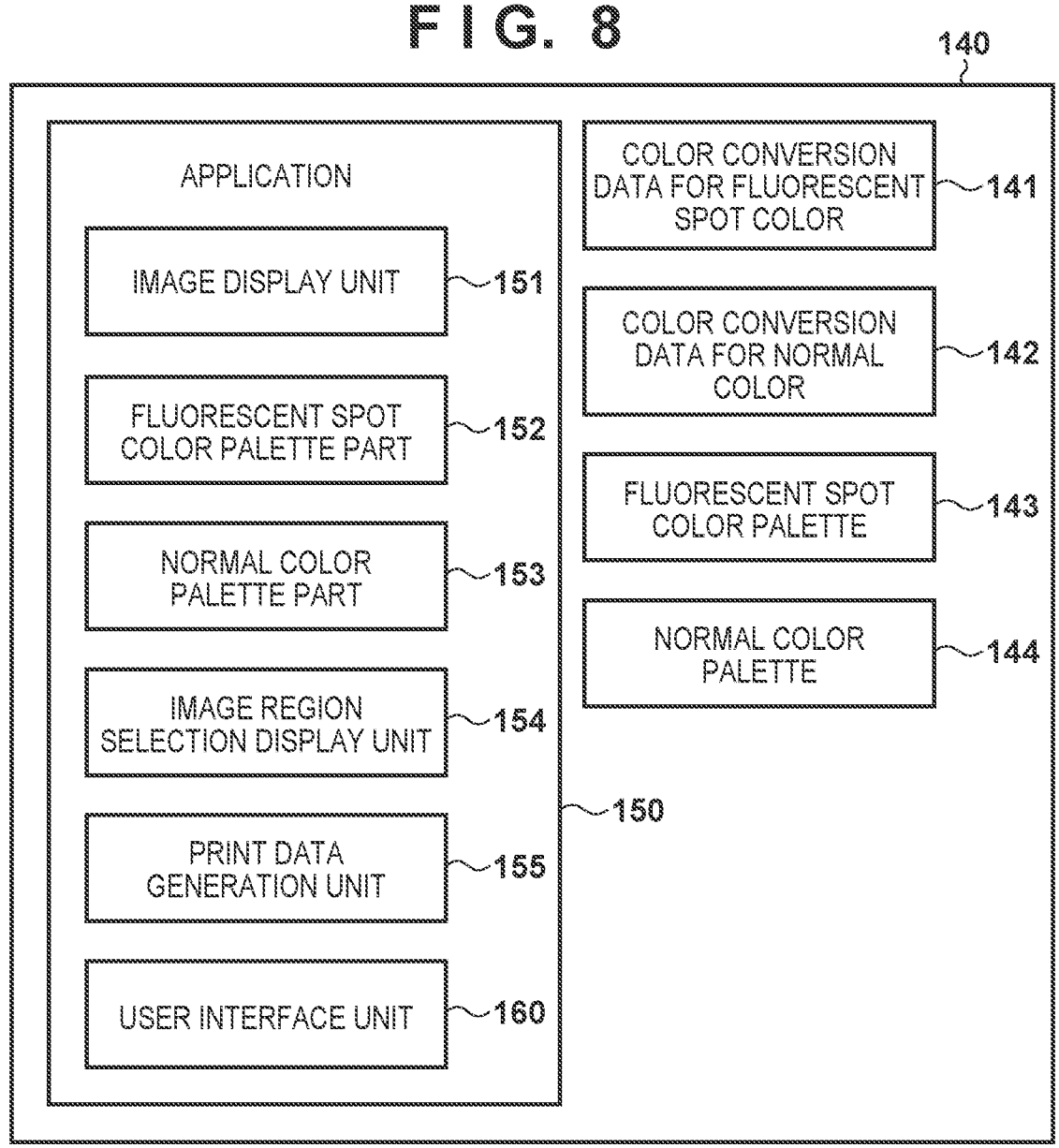
FIG. 7 is a diagram illustrating correspondence between RGB values of fluorescent spot colors and values of ink separation.
FIG. 8 is a diagram illustrating data stored in a storage unit.

In the present embodiment, the RGB values to be specified for printing the fluorescent spot colors 1 to 3 are preliminarily determined as illustrated in FIG. 7. The correspondence relation between the RGB values and ink separation for fluorescent spot colors as illustrated in FIG. 7 is determined in common between the image processing apparatus 20 and the printing apparatus 10. Since the fluorescence spot colors are defined as RGB values in the present embodiment, the user can easily specify a fluorescent spot color as a color palette in the application.

Although the present embodiment has been described taking the single-color fluorescent pink as an example, any combination with other ink may be similarly used as the fluorescent spot color as long as it provides the light emission efficiency of the fluorescent pink ink. For example, an output from a combination of the fluorescent pink and the fluorescent yellow can be used as the fluorescent spot color. In addition, even when only the single-color fluorescent pink is installed on the printing apparatus 10 as the fluorescent ink, a similar color development efficiency and color gamut enlargement efficiency can be realized by a combination of the fluorescent pink and yellow.

Explanation of Image Processing Apparatus

As illustrated in FIG. 8, the storage unit 140 stores an application program 150 (simply referred to as an application 150 below). In addition, the storage unit 140 stores color conversion data for fluorescent spot color 141, color conversion data for normal color 142, a plurality of fluorescent spot color palettes data 143 set in the application 150, and color palette data for normal-color 144.

Figure 4:
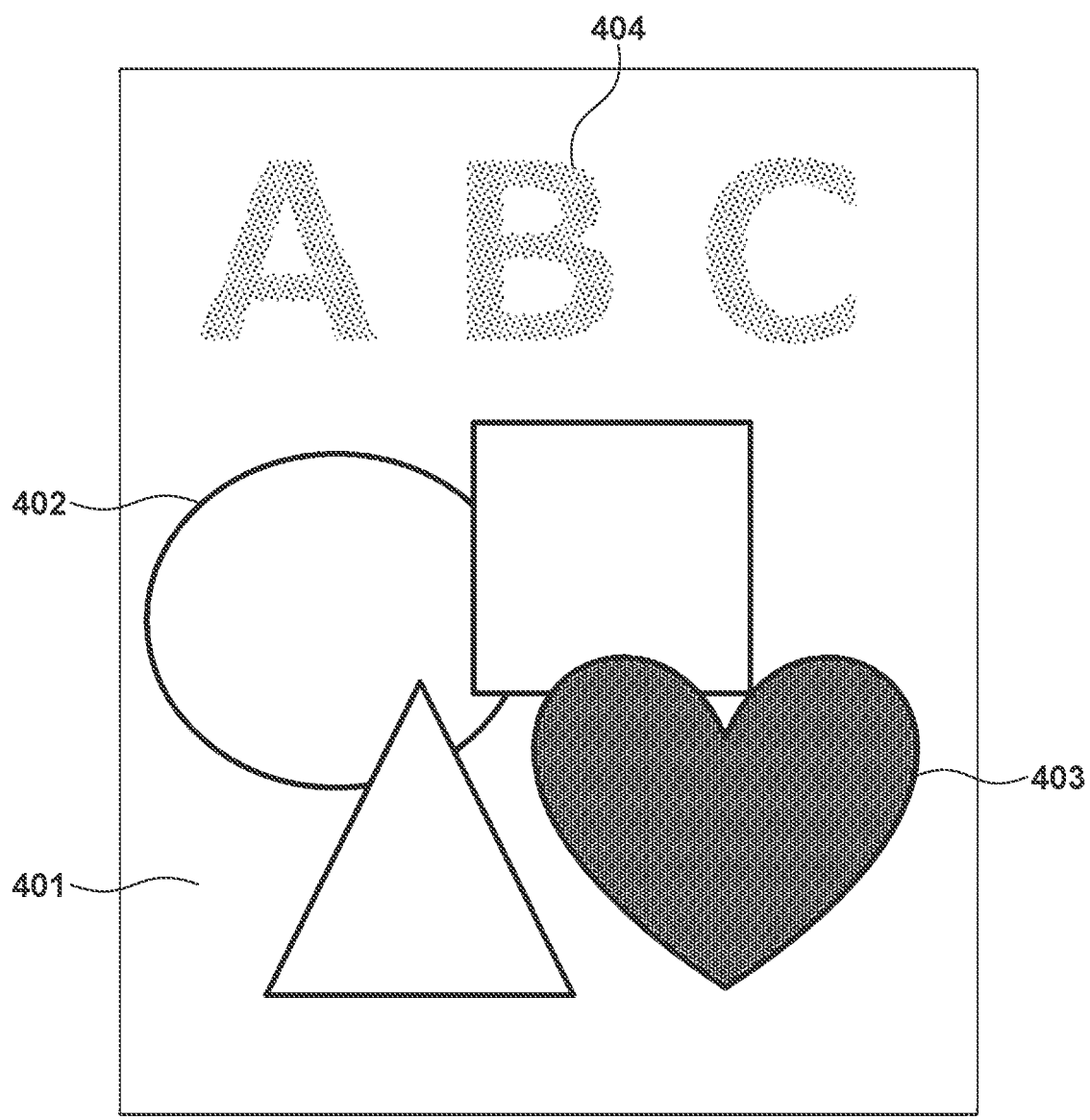
FIG. 4 is a diagram illustrating a poster image.
Figure 5:
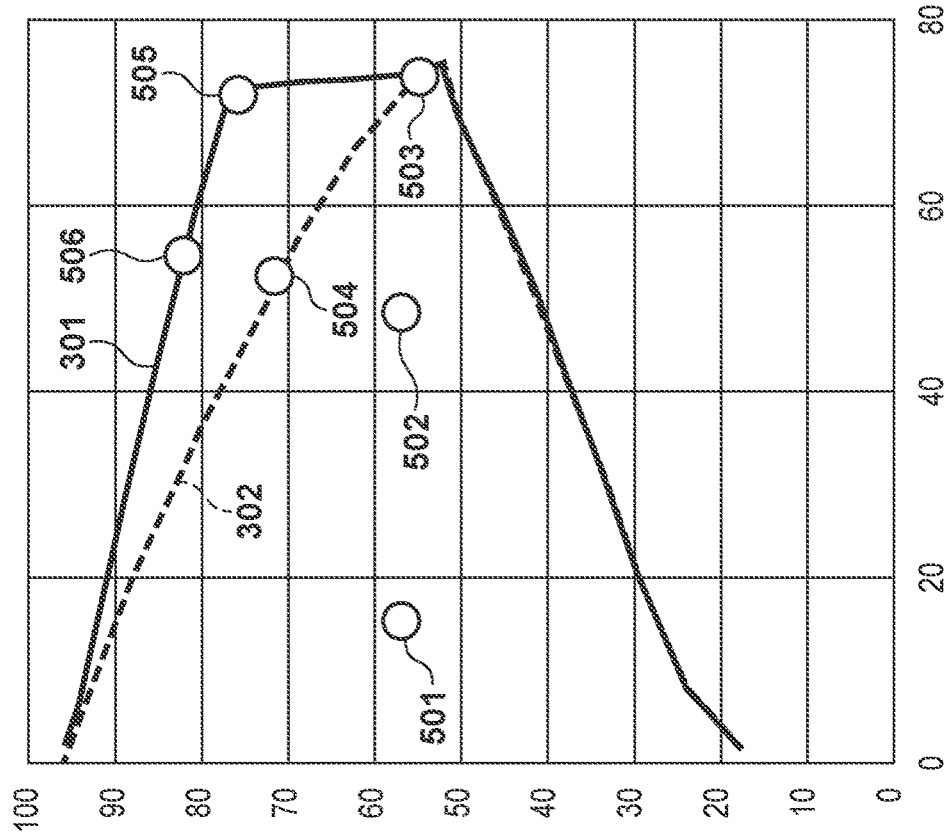
FIG. 5 is a diagram illustrating a color gamut using fluorescent pink and a color gamut that can be printed without using fluorescent pink.

The application 150 is a program for realizing an image editing function, which is used for generating a poster image as illustrated in FIG. 4, for example. In the present embodiment, the application 150 has a fluorescent spot color selection display function for selecting a fluorescent spot color to be reproduced on a printed material when print data is printed by the printing apparatus 10. Since the RGB values are defined for the fluorescent spot color in the present embodiment, it is possible to execute a similar operation as that of a normal color palette which is not the fluorescent spot color. The application 150 includes an image display unit 151, a fluorescent spot color palette unit 152, a normal-color color palette unit 153, an image region selection display unit 154, a print data generation unit 155, and a user interface unit 160 in order to realize the fluorescent spot color selection display function.

Figure 9:
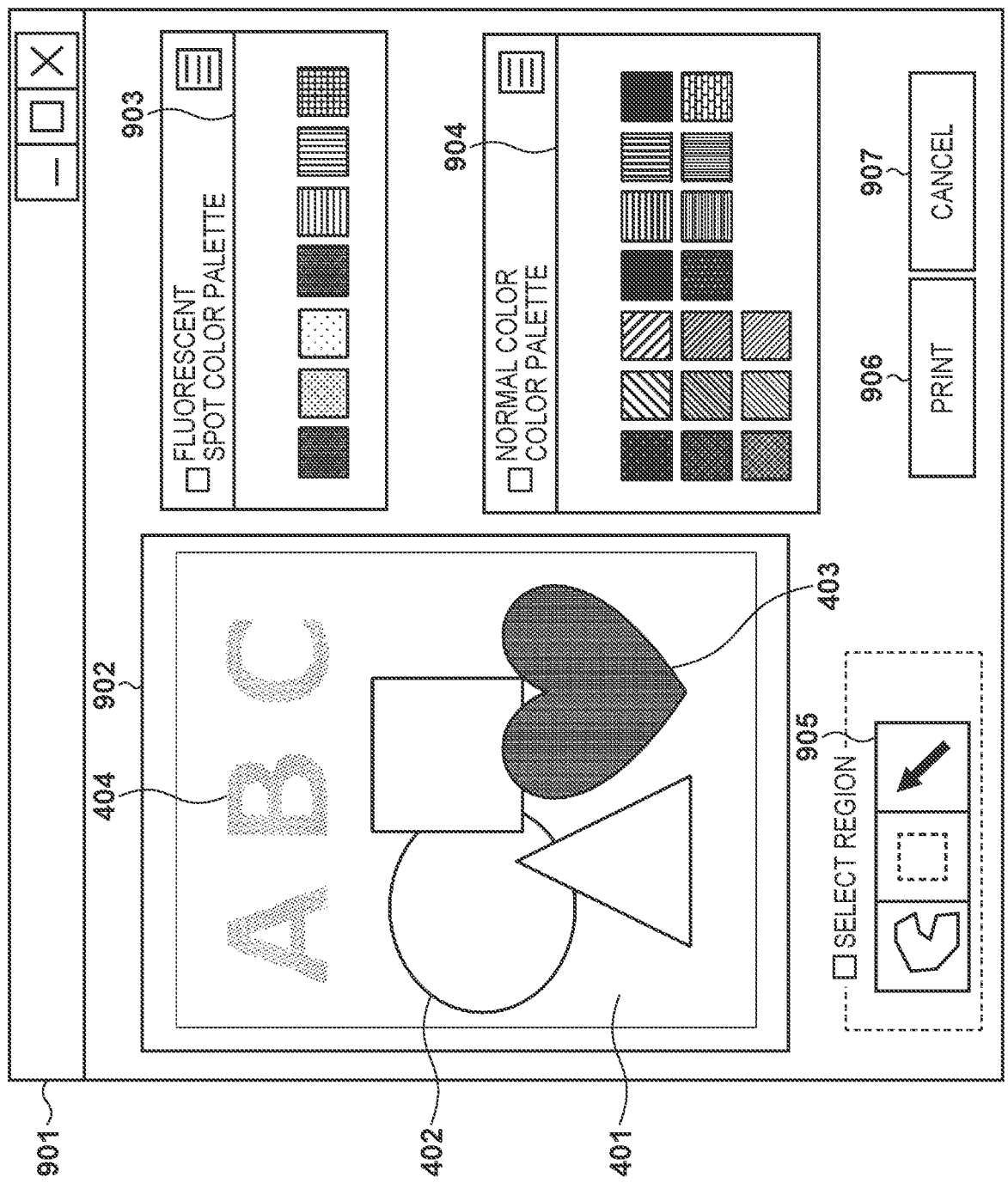
FIG. 9 is a diagram illustrating an application screen.

When the application 150 is activated, the user interface unit 160 displays a Graphical User Interface (GUI) screen, based on display data generated by each of the image display unit 151, the fluorescent spot color palette unit 152, the normal-color color palette unit 153, and the image region selection display unit 154. For example, a screen 901 illustrated in FIG. 9 is displayed by the user interface unit 160. The application 150 can accept a print instruction to print an edited image from a user via a GUI such as for example a screen 901 provided by the user interface unit 160. Upon accepting a print instruction from the user, the application 150 causes the print data generation unit 155 to generate print data. It is assumed in the present embodiment that the data size is reduced by lossy compression such as JPEG in generation of print data. In addition, data reduction may be performed by lossy compression such as JPEG when the image data which is edited as necessary is stored. In such a case, the stored data is directly used as print data. The print data generated by the print data generation unit 155 is transmitted to the printing apparatus 10 via the image processing apparatus I/F 109.

Now, a process to be performed by the application 150 to generate a poster image using the fluorescent spot colors as illustrated in FIG. 4 will be described.

FIG. 9 is a diagram illustrating a UI screen of the application 150. A screen 901 includes an image display part 902 configured to display a poster image that is generated and edited by the application 150. Display of the image display part 902 is performed based on the display data generated by the image display unit 151 of the application 150. FIG. 9 illustrates the poster image illustrated in FIG. 4 being displayed on the image display part 902.

In addition, the screen 901 includes a fluorescent spot color palette part 903 for accepting a selection of a fluorescent spot color, and a normal color palette part 904 for accepting a selection of a normal color which is not the fluorescent spot color. The fluorescent spot color palette part 903 is displayed based on the display data generated by the fluorescent spot color palette display unit 152. The normal color palette part 904 is displayed based on the display data generated by the normal color palette display unit 153.

In the fluorescent spot color palette part 903, the fluorescent spot colors defined in FIG. 7, for example, the fluorescent spot colors 1 to 3 described above are displayed. In addition, the correspondence table illustrated in FIG. 7 is stored in the storage unit 140 as the color conversion data for fluorescent spot color 141. The fluorescent spot color palette part 903 is a color palette defined by RGB values, as illustrated in FIG. 7. The fluorescent spot color palette data generated by the fluorescent spot color palette part 903 is stored in the storage unit 140 as a fluorescent spot color palette 143.

Figures 10, 11:
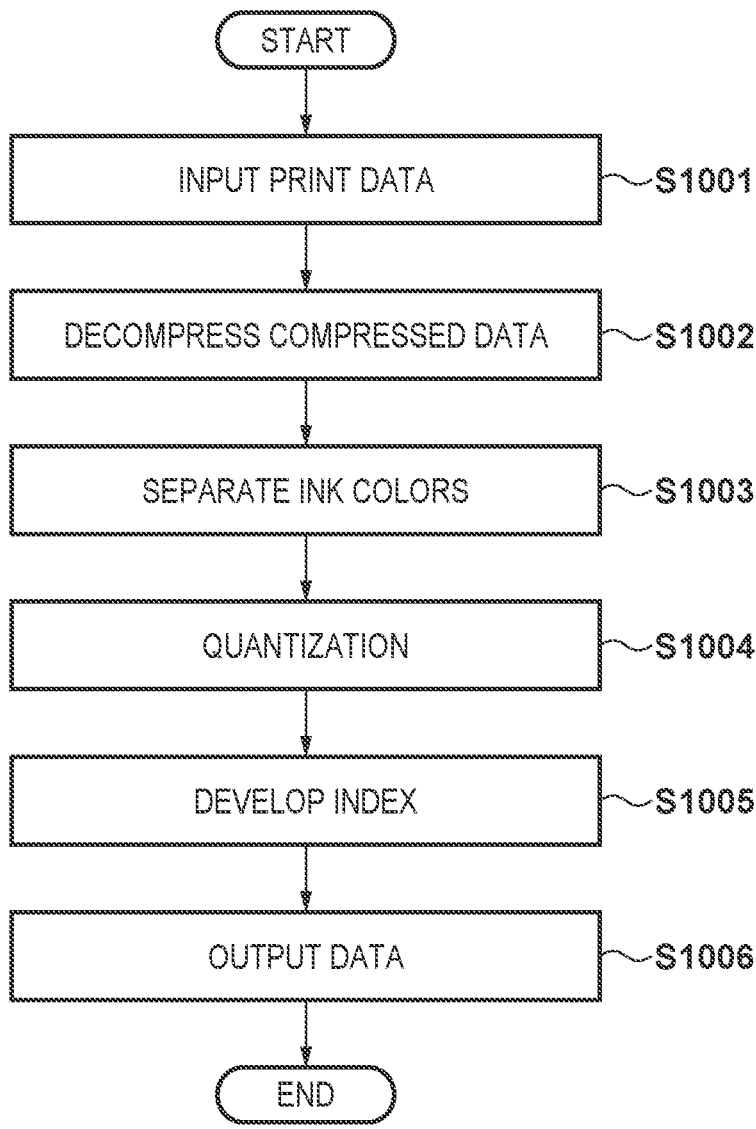
FIG. 10 is a flowchart illustrating a printing processing to be performed by the printing apparatus.
FIG. 11 is a diagram illustrating correspondence between RGB values of normal colors and values of ink separation.

In the normal color palette part 904, the normal colors defined in FIG. 11 is displayed. The correspondence table in FIG. 11 defines the correspondence relation between RGB values and ink separation for normal colors. The correspondence table in FIG. 11 is stored in the storage unit 140 as color conversion data for normal color 142. The normal color palette part 904 is a color palette defined by RGB values equivalent to those installed in an OS-standard paint application or other general applications. The color palette data generated by the normal color palette part 904 is stored in the storage unit 140 as a normal color palette 144.

A selection region setting part 905 can accept an instruction to select and display at least a part of the image region of the poster image displayed on the image display part 902. A print button 906 is a button that can accept a print instruction for the edited image data. When the print instruction is accepted, the print data generation unit 155 generates print data. A cancel button 907 is a button that can accept an instruction to cancel the process on the screen 901.

As has been described above, the storage unit 140 stores not only the fluorescent spot color palette data but also the color conversion data for fluorescent spot color 141. Therefore, when the user selects a fluorescent spot color palette with the fluorescent spot color palette part 904, the ink separation or colorimetric values may be displayed, or colors may be reflected on the preview image based on colorimetric values.

Figure 22:
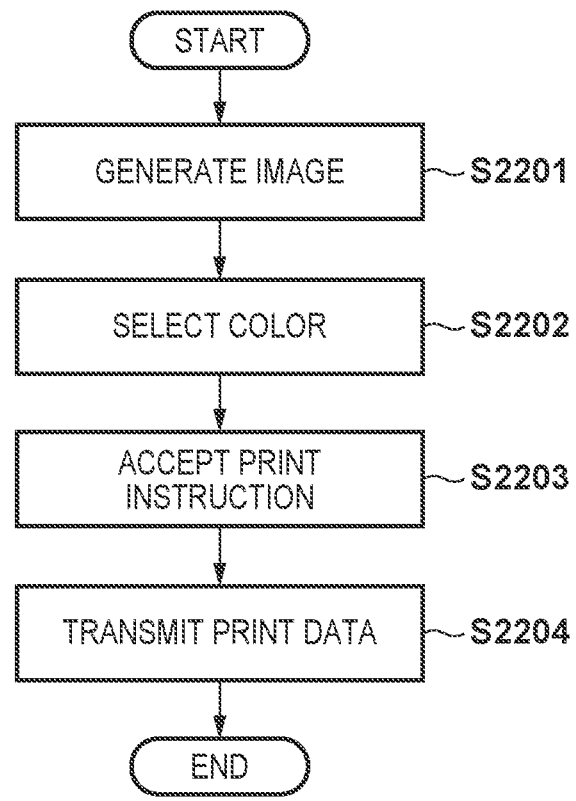
FIG. 22 is a flowchart illustrating a processing to be executed by an image processing apparatus.

Activation of the application 150 starts generation of a poster image. FIG. 22 is a flowchart illustrating a process to be executed by the printing apparatus 10 until the print data is generated by the application 150. The process illustrated in FIG. 22 is realized by the CPU of the main control unit 108, for example, reading and executing the program stored in the ROM.

At S2201, the main control unit 108 generates a poster image in accordance with the user's operation. The poster image may be generated based on a template preliminarily prepared in the application 150, or may be generated from scratch. The poster image generation function may be a function that can be realized by a general application, which allows for arranging characters, figures, or images, in an arbitrary manner, for example. Here, it is assumed that the poster image includes a background 401, a FIG. 402, a FIG. 403, and a character 404. The user interface unit 160 displays the generated poster image on the image display part 902.

At S2202, the main control unit 108 accepts a selection of a color to be used on the poster image. It is assumed that the colors to be used for the background 401 and the FIG. 402 are selected from the normal color palette part 904. On the other hand, it is assumed that the color to be used for the FIG. 403 is the fluorescent spot color 1 selected from the fluorescent spot color palette part 903. When the fluorescent spot color 1 is selected, the FIG. 403 is filled with RGB=(255, 0, 255) defined in the correspondence table in FIG. 7. It is assumed that the color to be used in the character 404 is the fluorescent spot color 2 selected from the fluorescent spot color palette part 903. When the fluorescent spot color 2 is selected, the character 404 is filled with RGB=(255, 64, 255) defined in the correspondence table illustrated in FIG. 7. In the present embodiment, the fluorescent spot color palette is preliminarily defined by RGB values as illustrated in FIG. 7, and therefore the generated poster image data can be described by RGB values only. Accordingly, any application that can process RGB values can fill, with the color palette function, a character or a figure desired to be output in the fluorescent spot color with RGB values, by using the RGB values defined in the fluorescent spot color.

At S2203, the main control unit 108 accepts pressing of the print button 906 (print instruction). When the pressing of the print button 906 is accepted, the main control unit 108 performs, at S2204, lossy compression of the RGB data representing the poster image according to JPEG or the like, and transmits the compressed RGB data to the printing apparatus 10 as print data.

FIG. 10 is a flowchart illustrating a printing processing to be executed by the printing apparatus 10. The process illustrated in FIG. 10 is realized by the CPU of the main control unit 101, for example, reading and executing a program stored in the ROM.

At S1001, the main control unit 101 inputs, via the printing apparatus I/F 105, the print data generated by the image processing apparatus 20. Here, the input print data is RGB data defined by RGB values, which is lossy compressed according to JPEG or the like. At S1002, the main control unit 101 decompresses the input print data. Here, the RGB values may shift when the lossy compressed data is decompressed.

At S1003, the main control unit 101 separates the decompressed print data (RGB data) into ink colors to be used in the printing apparatus 10. For example, the RGB data is separated into 16-bit gradation data (density data) respectively for C, M, Y, K, FP, and FY (ink color separation). Accordingly, three channels (three colors) of 16-bit gray images are generated. In the ink color separation process, an interpolation operation is performed, referring to a lookup table (LUT) preliminarily stored in a ROM or the like. In the present embodiment, it is assumed that the conversion of the RGB values of the spot color into C, M, Y, K, FP, and FY of the ink separation is performed using an LUT described later. For interpolation operation of the LUT, any known method may be used such as cubic interpolation or tetrahedral interpolation.

At S1004, the main control unit 101 performs a quantization process on gradation data corresponding to each ink color to convert the gradation data into quantization data of several bits. For example, in quantizing into a ternary value, the gradation data is converted into 2-bit data of level 0 to level 2.

At S1005, the main control unit 101 performs an index development process. Specifically, a single dot arrangement pattern is identified, in accordance with the level obtained at S1004, from a plurality of dot arrangement patterns having defined therein the number and the positions of dots to be printed on each pixel. In this process, the dot arrangement table may be configured to differentiate, depending on the level value, the number of dots to be printed in a region corresponding to each pixel, or may be configured to differentiate the size of dots depending on the level value.

At S1006, the main control unit 101 drives the print head 115 and the paper feed/discharge motor control unit 104 to print an image on the print medium, based on the output data subjected to the index development process, and terminates the process illustrated in FIG. 10.

Figure 12:
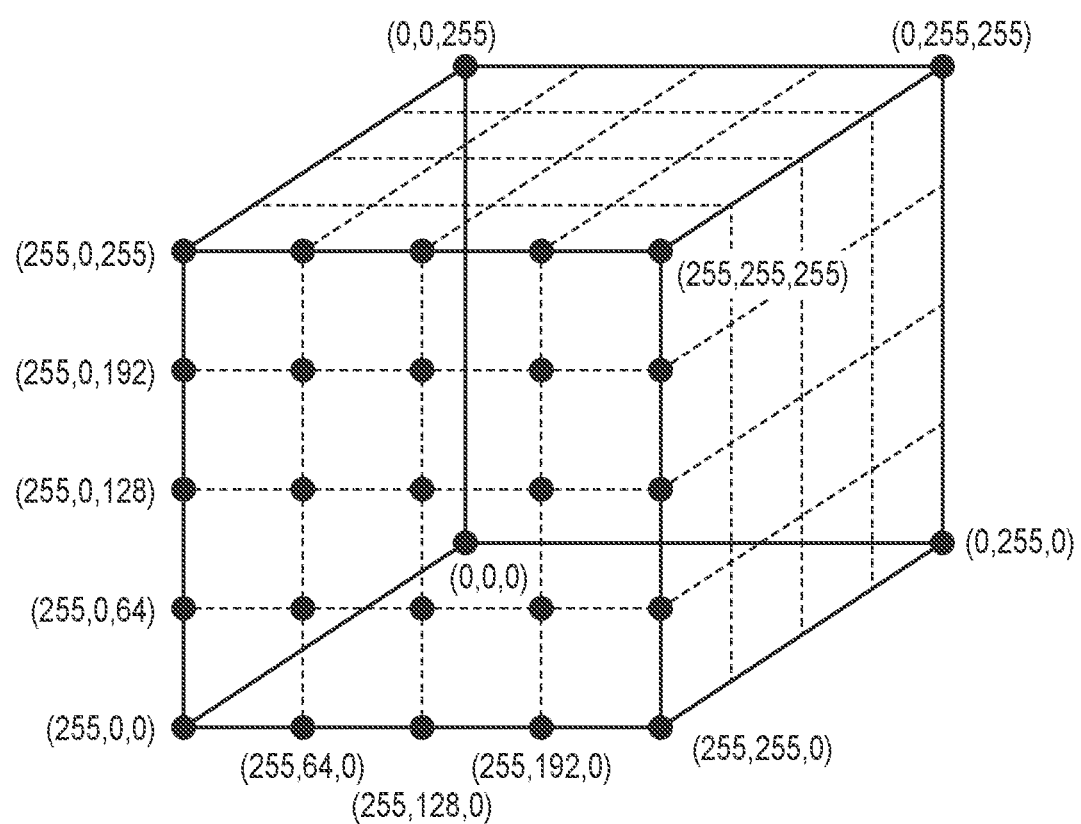
FIG. 12 is a diagram illustrating an LUT to be used for ink separation from RGB.

The LUT to be used at S1003 will be described below. Here, for simplicity, a 5-Grid LUT illustrated in FIG. 12 is taken as an example in the description. FIG. 12 illustrates an LUT to be used for ink separation from RGB into C, M, Y, K, FP, and FY (also denoted CMYKFPFY below), and correspondence relation of C, M, Y, K, FP, and FY of the ink separation, as illustrated in FIG. 13 for example, is assigned to RGB values that are grid points.

Generation of the LUT illustrated in FIGS. 12 and 13 will be described. First, an LUT is generated for ink separation into CMYK from RGB for an output with normal colors without using fluorescent pink, as illustrated in FIG. 14. Here, the LUT may be generated by any known method. In the LUT generated here, FP and FY are defined to be 0 as illustrated in FIG. 14.

Next, the LUT in FIG. 14 is corrected such that the fluorescent spot color can be output by the LUT. Correction of the LUT illustrated in FIG. 14 uses a correspondence table between RGB and ink separation as illustrated in FIG. 15. The correspondence table in FIG. 15 has preliminarily defined therein the correspondence relation between RGB and the fluorescent ink FP and FY. The correspondence table in FIG. 15 has defined therein values of FP and FY for each spot color on a plane with R=255 in the RGB color space.

The preliminarily defined correspondence relation between RGB and output ink separation illustrated in FIG. 15 is used to replace the RGB values of grid points defined as spot colors with the CMYKFPFY values for outputting spot colors defined in FIG. 15. In the LUT illustrated in FIG. 14, for example, CMYKFPFY=(0, 0, 25, 0, 0, 0) is defined for RGB=(255, 255, 192). Here, CMYKFPFY=(0, 0, 0, 0, 0, 25) is defined for RGB=(255, 255, 192) in the correspondence table illustrated in FIG. 15. The ink separation for RGB=(255, 255, 192) is therefore replaced by CMYKFPFY=(0, 0, 0, 0, 0, 25), as illustrated in FIG. 13.

Similarly, CMYKFPFY=(0, 100, 0, 0, 0, 0) is defined for RGB=(255, 0, 255), although not illustrated in FIG. 14. Here, CMYKFPFY=(0, 0, 0, 0, 100, 0) is defined for RGB=(255, 0, 255) in the correspondence table illustrated in FIG. 15. The ink separation for RGB=(255, 0, 255) is therefore replaced by CMYKFPFY=(0, 0, 0, 0, 100, 0), as illustrated in FIG. 13. Here, the fluorescent spot color palette 143 stored in the storage unit 140 of the image processing apparatus 20 corresponds to the relation between the RGB values and the CMYKFPFY values in the LUTs illustrated in FIGS. 12 and 13, in which the values of the LUTs are replaced in the printing apparatus 10 as described above.

As has been described above, the LUT to be used at S1003 is generated. It is assumed in the present embodiment that the RGB values specified by fluorescent spot colors are RGB values of the grid points of the LUT. Accordingly, when the RGB values specified as fluorescent spot colors are input as the print data, ease of control of ink separation can be realized by outputting the CMYKFPFY values corresponding to the RGB values.

With regard to the effect of the present embodiment, an influence of a shift in RGB values due to lossy compression such as JPEG performed by the print data generation unit 155 of the application 150 will be described first. As has been described above, the FIG. 403 in FIG. 9 is assumed to be filled with RGB=(255, 0, 255) of the spot color 5. The RGB values of the spot color 5 decompressed at S1002 may shift such as RGB=(255, 5, 255), for example, due to lossy compression according to JPEG. Similarly, the character 404 is assumed to be filled with RGB=(255, 64, 255) of the spot color 10. The RGB decompressed at S1002 may shift to, for example, RGB=(255, 58, 255) due to lossy compression according to JPEG.

According to the present embodiment, ink separation is performed at S1003 by interpolation operation using the LUTs illustrated in FIGS. 12 and 13, even when RGB values is shifted from defined values of the fluorescent spot color. For simplicity of explanation, description will be provided in two dimensions as illustrated in FIG. 16.

Figures 16, 17:
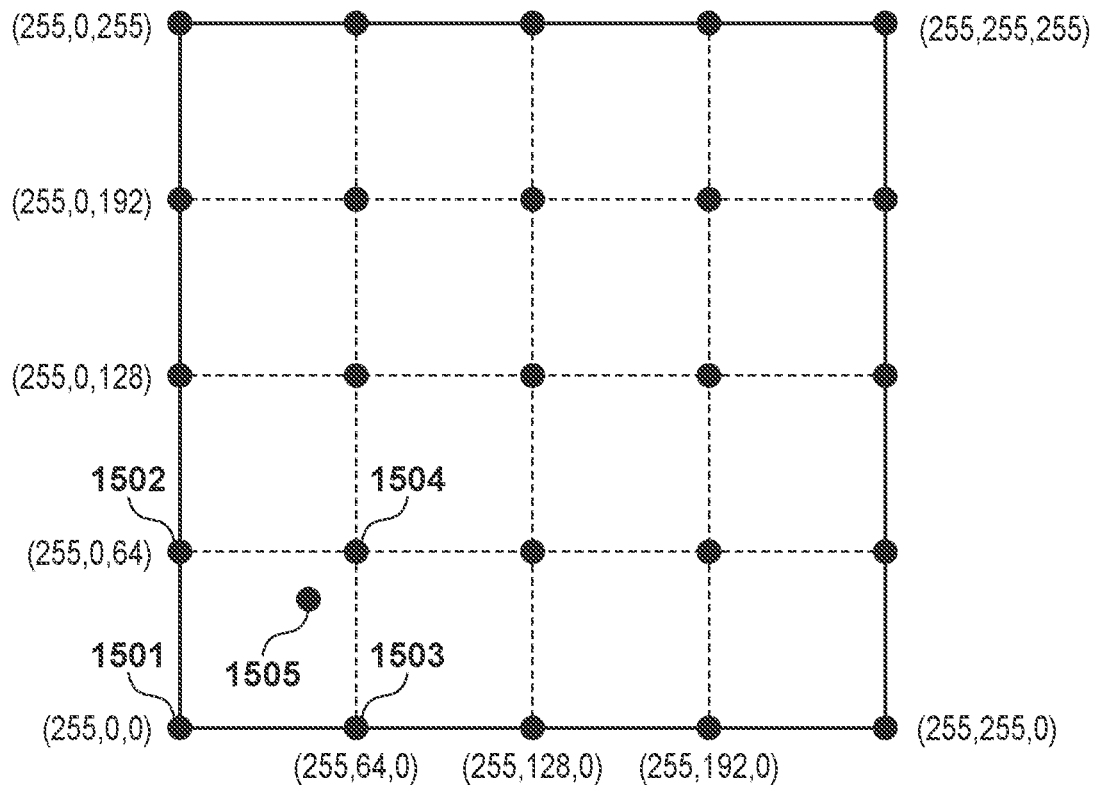
FIG. 16 is an explanatory diagram of an effect of an embodiment.
FIG. 17 is an explanatory diagram of an effect of an embodiment.

FIG. 16 illustrates a view extracting the outermost surfaces constituted by RGB (255, 0, 0), (255, 0, 255), (255, 255, 0), and (255, 255, 255) with respect to the LUT illustrated in FIG. 12.

Grid points 1501, 1502, 1503 and 1504 are RGB=(255, 0, 0), RGB=(255, 0, 64), RGB=(255, 64, 0) and RGB=(255, 64, 64), respectively. The grid points 1501, 1502, 1503 and 1504 coincide to fluorescent spot colors 1, 2, 6 and 7, respectively. Ink separation of the fluorescent spots here is as illustrated in FIG. 15.

It is assumed that, although the user has specified RGB=(255, 64, 64) corresponding to the spot color 7 in the application 150, the RGB values are shifted to a color 1505 (RGB=(255, 48, 50)) due to lossy compression according to JPEG or the like.

In the present embodiment, when the cubic interpolation is used as interpolation operation, here R=255, the ink separation of the color 1505 is determined based on four colors of a square including the RGB values to be calculated. All the four colors (grid points 1501, 1502, 1503 and 1504) required for calculating the color 1505 are defined by the fluorescent spot colors, and ink separation is performed with fluorescent ink. Therefore, the ink separation of the color 1505 calculated by interpolation operation is CMYKFPFY= (0, 0, 0, 0, 78.1%, 76.6%), and ink separation with fluorescent ink is performed. In other words, grid points adjacent to the grid point corresponding to the fluorescent spot color are also arranged as the fluorescent spot colors. Accordingly, it is possible to appropriately realize a color development as a fluorescent spot color even when the RGB values specifying the fluorescent spot color are shifted due to lossy compression. Here, the foregoing description is provided for a case of using cubic interpolation. For a case of tetrahedral interpolation, interpolation is performed using three grid points including the color 1505 as for a case of FIG. 16, in which case it is also possible to realize color development as a fluorescent spot color.

Now, for comparison, a case of using an LUT, in which grid points adjacent to the grid point of a fluorescent spot color are performed with ink separation as normal color, and grid points corresponding to the fluorescent spot color are not continuously arranged, will be described. Here, the definition of the fluorescent spot color is as illustrated in FIG. 16. For simplicity, only the part of RGB=(255, 64, 64) is assumed to be a fluorescent spot color. As has been described above, it is assumed that the RGB values are shifted to a color 1505 (RGB=(255, 48, 50)) due to lossy compression according to JPEG or the like. In this case, the ink separation of the color 1505 is determined based on the four colors of the square including the RGB values to be calculated. In the four colors (grid points 1501, 1502, 1503 and 1504) required to calculate the color 1505, only the grid point 1504 is a fluorescent spot color, and the other three colors are normal colors. The ink separation of the color 1505 calculated by interpolation operation results in CMYKFPFY=(0, 25%, 21.9%, 0, 56.3%, 59.6%), which includes a large amount of M-ink and Y-ink. In addition, it can be seen that the amount of FP-ink and FY-ink are also decreased in comparison with the result according to the present embodiment. As results, the light emission efficiency of the fluorescent ink is weakened due to mixture of M-ink. In other words, the light emission efficiency is weakened when the grid points adjacent to the grid point of the fluorescent spot color are normal-colors only.

As has been described above, according to the present embodiment, an LUT is used in which at least one of the grid points adjacent to the coordinates of the grid point corresponding to the fluorescent spot color is arranged as a fluorescence spot color. Accordingly, it is possible to perform printing that appropriately realizes a color development as a fluorescent spot color, even when the RGB values specifying the fluorescent spot color are shifted due to lossy compression according to JPEG or the like.

Second Embodiment

In the following, the present embodiment will be described, focusing on the difference from the first embodiment. The first embodiment has been described, taking as an example a combination of fluorescent pink and fluorescent yellow. However, as has been described referring to FIGS. 2 and 3, not only the combination of fluorescent pink and fluorescent yellow, but also a combination of ink of other colors that can obtain the color gamut enlargement efficiency may also be used. For example, an output of a combination of fluorescent pink and yellow may be used as the fluorescent spot color.

Figure 3:
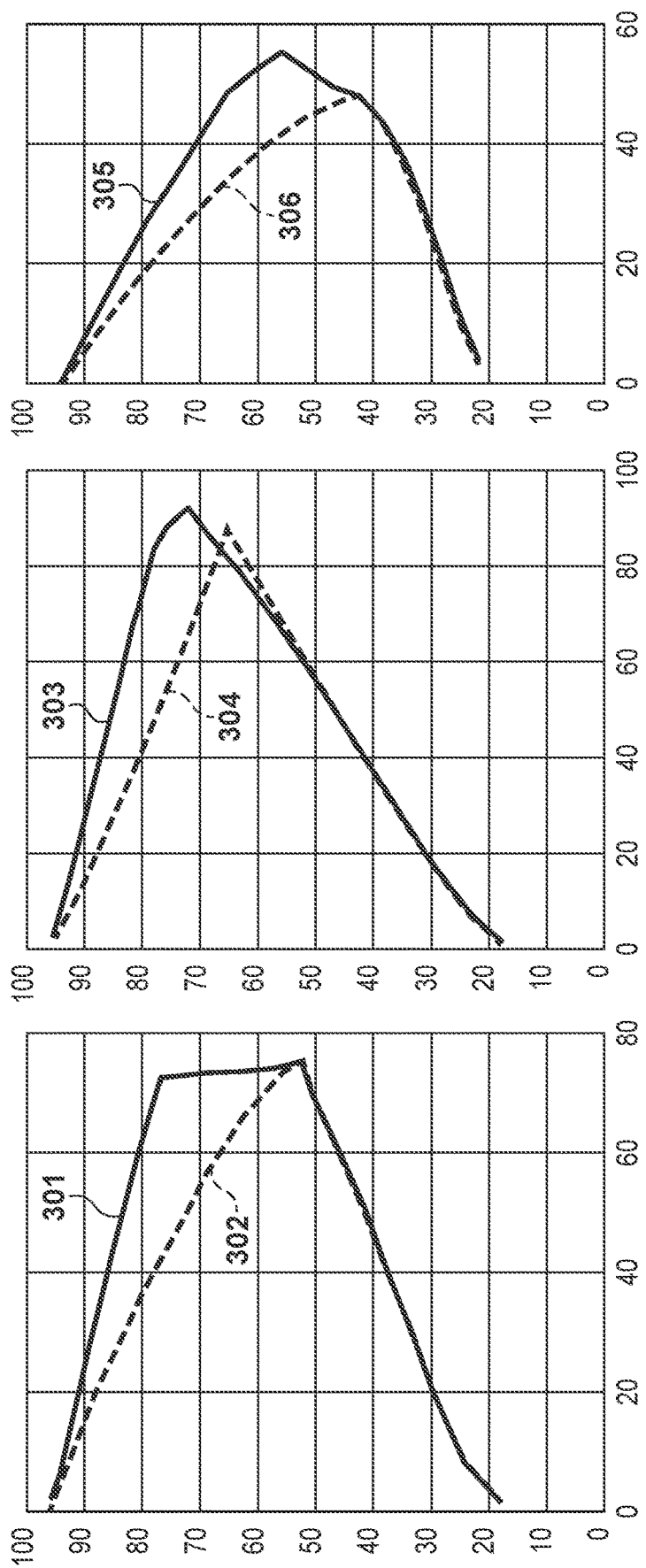
FIGS. 3A to 3C are explanatory diagrams of light emission efficiency and color gamut enlargement efficiency due to fluorescent ink.

In the first embodiment, grid points of fluorescent spot colors are assigned to the outermost surface constituted by RGB (255, 0, 0), (255, 0, 255), (255, 255, 0) and (255, 255, 255) as the combination of fluorescent pink and fluorescent yellow. Fluorescent spot colors can also be realized by other color combinations such as fluorescent pink and fluorescent blue, or fluorescent yellow and fluorescent green. However, since the color gamut enlargement efficiency of the fluorescent ink depends on the light emission efficiency of the fluorescent ink as illustrated in FIG. 3, the light emission efficiency is high in a bright color gamut but not so high in a dark color gamut. In the present embodiment, therefore, grid points used as fluorescent spot colors are assigned limiting to the following three regions in the LUT illustrated in FIG. 18:

The outermost surface constituted by RGB (255, 0, 0), (255, 0, 255), (255, 255, 0) and (255, 255, 255);
The outermost surface constituted by RGB (0, 255, 0), (255, 255, 0), (0, 255, 255) and (255, 255, 255); and
The outermost surface constituted by RGB (0, 0, 255), (255, 0, 0), (0, 255, 255) and (255, 255, 255).

In addition, grid points in a more limited region of each surface region may be defined as grid points to be used as fluorescent spot colors. For example, grid points in a region over respective surfaces of RGB=(255, 0, 255), (255, 255, 0) and (0, 255, 255) having the maximum brightness RGB=(255, 255, 255) at the center may be defined as grid points to be used as fluorescent spot colors.

Third Embodiment

In the following, the present embodiment will be described, focusing on the difference from the first and the second embodiments. The first embodiment is described taking as an example of printing using fluorescent spot colors. However, there is a case where not only printing is performed using fluorescent spot colors but also printing is performed using only normal colors without using the fluorescent spot color. In the present embodiment, the user can switch between such printing schemes on the application screen.

Figure 23:
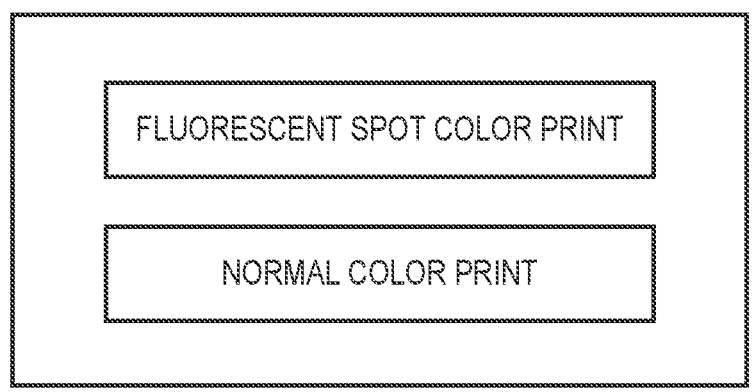
FIG. 23 is a diagram illustrating an application screen.

In the present embodiment, two buttons of a fluorescent spot color print button and a normal color print button as the print button 906 may be provided selectable for the user in the screen 901 illustrated in FIG. 9. Alternatively, a screen that allows selection of the fluorescent spot color print button and the normal color print button may be displayed as illustrated in FIG. 23, when the print button 906 is pressed. Additionally, in a case where no color from the color palette of the fluorescent spot color is used in the poster image generated on the screen 901, a display control may be performed such that the selection of the fluorescent spot color print button is disabled by displaying in gray or the like. In such a case, it is determined to be normal color printing. The selection result of the fluorescent spot color printing or the normal color printing is included in the print command and transmitted to the printing apparatus 10 together with the print data. In addition, information indicating the normal color printing may be included in the print command and transmitted to the printing apparatus 10 together with the print data, not only according to the result of selection by the user, but also a case where it is determined to be normal color printing.

Figure 19:
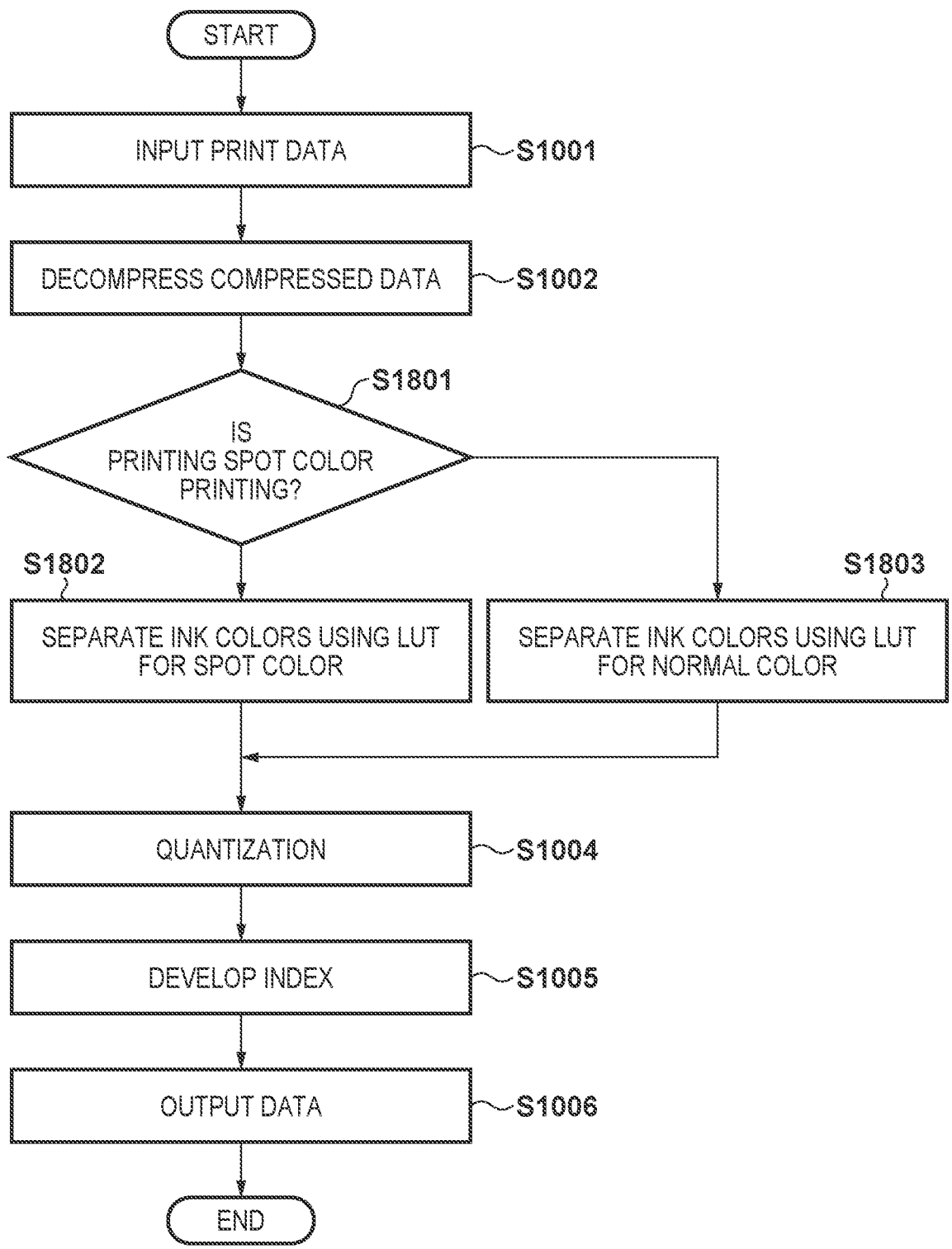
FIG. 19 is a flowchart illustrating a printing processing to be executed by the printing apparatus.

FIG. 19 is a flowchart illustrating a process to be performed by the printing apparatus 10. The process is realized by the CPU of the main control unit 101 reading a program stored in the ROM to the RAM and executing the same.

S1001 and S1002 are identical to S1001 and S1002 described in FIG. 10, and thus description thereof will be omitted. When the input print data is decompressed at S1002, the process proceeds to S1801.

At S1801, the main control unit 101 determines whether or not the printing is fluorescent spot color printing. For example, the main control unit 101 determines whether or not the printing is spot color printing, based on the result of the selection of the fluorescent spot color printing and the normal color printing included in the print command. When it is determined to perform fluorescent spot color printing, the process proceeds to S1802. At S1802, the processing corresponding to S1003 in FIG. 10 is executed. In other words, ink separation is performed using the LUTs illustrated in FIGS. 12 and 13. When, on the other hand, it is determined not to perform fluorescent spot color printing, the main control unit 101 performs ink separation at S1803 using the LUT for normal color printing. The LUT for normal color printing is an LUT that does not include ink separation for fluorescent ink that associates RGB values with CMYK values. After S1802 and S1803, the process proceeds to S1004. S1004 to S1006 are identical to S1004 to S1006 described in FIG. 10, and thus description thereof will be omitted.

As has been described above, the present embodiment allows for executing the process in which the LUTs between the fluorescent spot color printing and the normal color printing are switched. In the process illustrated in FIG. 18, the result of the selection of the fluorescent spot color printing and the normal color printing is transmitted to the printing apparatus 10 for each job, for example. In addition, the information about whether or not to use the fluorescent spot color for each color palette may be included in the print command and transmitted to the printing apparatus 10.

The main control unit 101 may be provided at the middle of the printing apparatus 10 and the image processing apparatus 20, as a separate body from the printing apparatus 10 and the image processing apparatus 20. Alternatively, a data processing apparatus, which executes the step S1003 and subsequent steps illustrated in FIG. 10 of converting RGB data transmitted from the image processing apparatus 20 into the subtractive color mixture ink data or the ink data including the fluorescent ink for the printing apparatus 10, may be provided at the middle of the printing apparatus 10 and the image-processing apparatus 20, as a separate body from the printing apparatus 10 and the image-processing apparatus 20.

In addition, although the fluorescent spot colors are represented using the fluorescent ink in the aforementioned embodiment, metallic spot colors may be represented by using metallic ink containing metal particles.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075361, filed Apr. 28, 2022, which is hereby incorporated by reference herein in its entirety.

What is claimed is:
1. A processing apparatus comprising:
an input unit configured to input image data representing color values of RGB color space; and
a generation unit configured to generate ink data representing a density value of subtractive color mixture ink and a density value of fluorescent color ink for forming an image on a print medium, by using a first lookup table in which density values respectively corresponding to the subtractive color mixture ink and the fluorescent color ink to be used by a printing apparatus is associated with each coordinate in the RGB color space, wherein
the first lookup table is a lookup table for converting a color value of a first coordinate in the RGB color space into ink data corresponding to the subtractive color mixture ink, and for converting a color value of a second coordinate in the RGB color space into ink data corresponding to the fluorescent color ink, and
at least one of a plurality of coordinates adjacent to the second coordinate is the second coordinate.
2. The processing apparatus according to claim 1, wherein a part of the region in the RGB color space is configured by the second coordinate.

3. The processing apparatus according to claim 2, wherein a part of the region in the RGB color space is a region including a coordinate of a maximum brightness in the RGB color space.

4. The processing apparatus according to claim 1, wherein
the generation unit generates the ink data by a second lookup table which is different from the first lookup table, and
a coordinate of a color value to be converted, according to the second lookup table, into the ink data is a coordinate of a color value to be converted into the ink data of the subtractive color mixture ink, and does not include a coordinate of a color value to be converted into the ink data of the fluorescent color ink.

5. The processing apparatus according to claim 4, wherein the first lookup table is generated based on the second lookup table.

6. The processing apparatus according to claim 5, wherein:
the first lookup table is generated by replacing, by the density value of the fluorescent color ink, the density value of the subtractive color mixture ink corresponding to a predetermined coordinate among the coordinates in the second lookup table.

7. The processing apparatus according to claim 4, further comprising:
a reception unit configured to receive a command that instructs formation of the image, wherein
the generation unit generates the ink data by switching between the first lookup table and the second lookup table, in accordance with the command received by the reception unit.

8. The processing apparatus according to claim 1, wherein the image data input by the input unit is lossy compressed data.

9. The processing apparatus according to claim 8, further comprising:
a decompression unit configured to decompress the lossy compressed data, wherein
the generation unit generates the ink data by using the data decompressed by the decompression unit.

10. The processing apparatus according to claim 1, wherein the subtractive color mixture includes at least one of cyan, magenta, yellow and black.

11. The processing apparatus according to claim 1, further comprising a control unit configured to control formation of the image in the print medium, based on the ink data generated by the generation unit.

12. The processing apparatus according to claim 1, wherein the fluorescent color ink is color material that develops color by entering an excited state from a ground state by absorbing light of an excitation wavelength, and returning to the ground state by emitting light of an emission wavelength.

13. The processing apparatus according to claim 1, wherein a plurality of the second coordinates is continuously arranged in the first lookup table.

14. A method comprising:
inputting image data representing color values of RGB color space; and
generating ink data representing a density value of subtractive color mixture ink and a density value of fluorescent color ink for forming an image on a print medium, by using a first lookup table in which density values respectively corresponding to the subtractive color mixture ink and the fluorescent color ink to be used by a printing apparatus is associated with each coordinate in the RGB color space, wherein
the first lookup table is a lookup table for converting a color value of a first coordinate in the RGB color space into ink data corresponding to the subtractive color mixture ink, and for converting a color value of a second coordinate in the RGB color space into ink data corresponding to the fluorescent color ink, and
at least one of a plurality of coordinates adjacent to the second coordinate is the second coordinate.

15. A non-transitory computer-readable storage medium storing a program configured to cause a computer to function to:
input image data representing color values of RGB color space; and
generate ink data representing a density value of subtractive color mixture ink and a density value of fluorescent color ink for forming an image on a print medium, by using a first lookup table in which density values respectively corresponding to the subtractive color mixture ink and the fluorescent color ink to be used by a printing apparatus is associated with each coordinate in the RGB color space, wherein
the first lookup table is a lookup table for converting a color value of a first coordinate in the RGB color space into ink data corresponding to the subtractive color mixture ink, and for converting a color value of a second coordinate in the RGB color space into ink data corresponding to the fluorescent color ink, and
at least one of a plurality of coordinates adjacent to the second coordinate is the second coordinate.

16. A processing apparatus comprising:
an input unit configured to input image data representing color values of RGB color space; and
a generation unit configured to generate ink data representing a density value of subtractive color mixture ink and a density value of metallic color ink for forming an image on a print medium, by using a lookup table in which density values respectively corresponding to the subtractive color mixture ink and the metallic color ink to be used by a printing apparatus is associated with each coordinate in the RGB color space, wherein
the lookup table is a lookup table for converting a color value of a first coordinate in the RGB color space into ink data corresponding to the subtractive color mixture ink, and for converting a color value of a second coordinate in the RGB color space into ink data corresponding to the metallic color ink, and
at least one of a plurality of coordinates adjacent to the second coordinate in the RGB color space is the second coordinate.

17. A method comprising:
inputting image data representing color values of RGB color space; and
generating ink data representing a density value of subtractive color mixture ink and a density value of metallic color ink for forming an image on a print medium, by using a lookup table in which density values respectively corresponding to the subtractive color mixture ink and the metallic color ink to be used by a printing apparatus is associated with each coordinate in the RGB color space, wherein
the lookup table is a lookup table for converting a color value of a first coordinate in the RGB color space into ink data corresponding to the subtractive color mixture ink, and for converting a color value of a second coordinate in the RGB color space into ink data corresponding to the metallic color ink, and at least one of a plurality of coordinates adjacent to the second coordinate in the RGB color space is the second coordinate.

18. A non-transitory computer-readable storage medium storing a program configured to cause a computer to function to:

input image data representing color values of RGB color space; and generate ink data representing a density value of subtractive color mixture ink and a density value of metallic color ink for forming an image on a print medium, by using a lookup table in which density values respectively corresponding to the subtractive color mixture ink and the metallic color ink to be used by a printing apparatus is associated with each coordinate in the RGB color space, wherein the lookup table is a lookup table for converting a color value of a first coordinate in the RGB color space into ink data corresponding to the subtractive color mixture ink, and for converting a color value of a second coordinate in the RGB color space into ink data corresponding to the metallic color ink, and at least one of a plurality of coordinates adjacent to the second coordinate in the RGB color space is the second coordinate.

* * * * *